United States Patent
Coman

(10) Patent No.: US 10,272,805 B2
(45) Date of Patent: Apr. 30, 2019

(54) VEHICLE SEAT ASSEMBLY SUPPORT AND SECURING SYSTEMS

(71) Applicant: Survivability Solutions LLC, Sterling Heights, MI (US)

(72) Inventor: Sorin Coman, Waterford, MI (US)

(73) Assignee: Survivability Solutions LLC, Sterling Heights, MI (US)

( * ) Notice: Subject to any disclaimer, the term of this patent is extended or adjusted under 35 U.S.C. 154(b) by 250 days.

(21) Appl. No.: 15/097,940

(22) Filed: Apr. 13, 2016

(65) Prior Publication Data
US 2016/0297332 A1  Oct. 13, 2016

Related U.S. Application Data

(60) Provisional application No. 62/146,573, filed on Apr. 13, 2015, provisional application No. 62/211,711, filed on Aug. 29, 2015.

(51) Int. Cl.
*B60N 2/42* (2006.01)
*B60N 2/005* (2006.01)
(Continued)

(52) U.S. Cl.
CPC ........... *B60N 2/4256* (2013.01); *B60N 2/005* (2013.01); *B60N 2/24* (2013.01); *B60N 2/4242* (2013.01);
(Continued)

(58) Field of Classification Search
CPC ...... B60N 2/4256; B60N 2/4242; B60N 2/24; B60N 2/005; B60N 2002/0055
(Continued)

(56) References Cited

U.S. PATENT DOCUMENTS 3,059,966 A   10/1962  Spielman
3,532,379 A   10/1970  Reilly et al.
(Continued)

FOREIGN PATENT DOCUMENTS

EP        3100902 A2   12/2016
WO   WO2014085707 A2    6/2014
WO   WO2015012288 A1    1/2015

OTHER PUBLICATIONS

English language abstract and computer-generated translation of WO2015012288 extracted from espacenet.com database Feb. 9, 2017; 18 pages.

*Primary Examiner* — Jason S Morrow
*Assistant Examiner* — E Turner Hicks
(74) *Attorney, Agent, or Firm* — Howard & Howard Attorneys PLLC

(57) ABSTRACT

A securing system for supporting an object within a vehicle and for translating forces occurring therebetween. The system includes a component adapted to support the object within the vehicle, a mount adapted for attachment to the vehicle for concurrent movement with the vehicle, and an interface member operatively attached to and spaced from the mount. A coupler is operatively attached to one of the component and the interface member, and a receiver is operatively attached to the other of the component and the interface member. The receiver is selectively movable between a first position where the receiver secures the coupler for concurrent movement therewith and a second position where the coupler can be removed from the receiver. A translation module is interposed in force-translating relationship between the mount and the interface member to support the component when the coupler is secured to the receiver in the first position.

13 Claims, 20 Drawing Sheets

(51) Int. Cl.
*F41H 7/02* (2006.01)
*B60N 2/24* (2006.01)
*B60N 2/427* (2006.01)

(52) U.S. Cl.
CPC ..... *B60N 2/42736* (2013.01); *B60N 2/42754* (2013.01); *F41H 7/02* (2013.01); *B60N 2002/0055* (2013.01)

(58) Field of Classification Search
USPC ................ 296/68.1, 187.03, 187.05, 65.02
See application file for complete search history.

(56) References Cited

U.S. PATENT DOCUMENTS

| | | | |
|---|---|---|---|
| 3,792,896 A | 2/1974 | Eggert, Jr. | |
| 3,806,190 A | 4/1974 | Winslow | |
| 3,985,388 A * | 10/1976 | Hogan | B60N 2/163 244/122 R |
| 4,128,217 A | 12/1978 | Mazelsky | |
| 4,204,659 A | 5/1980 | Phillips et al. | |
| 4,523,730 A | 6/1985 | Martin | |
| 5,273,240 A * | 12/1993 | Sharon | B60N 2/4242 188/271 |
| 5,758,859 A | 6/1998 | Gonzalez | |
| H001833 H | 2/2000 | Hoppel et al. | |
| 6,257,663 B1 * | 7/2001 | Swierczewski | B60N 2/4214 297/216.16 |
| 7,393,039 B2 | 7/2008 | Ravid et al. | |
| 7,445,181 B2 * | 11/2008 | Knoll | B60N 2/4242 244/122 R |
| 7,484,799 B2 * | 2/2009 | Meyer | B60N 2/0715 248/622 |
| 7,533,924 B2 | 5/2009 | Ravid et al. | |
| 7,744,155 B2 | 6/2010 | List et al. | |
| 8,303,034 B2 * | 11/2012 | Gross | B60N 2/42736 296/68.1 |
| 8,408,643 B2 | 4/2013 | Honnorat | |
| 8,550,553 B1 | 10/2013 | Clark et al. | |
| 8,714,642 B2 | 5/2014 | Lamparter et al. | |
| 8,939,502 B2 | 1/2015 | Grant et al. | |
| 2009/0066126 A1 * | 3/2009 | Stevens | B60N 2/4242 297/216.17 |
| 2009/0267390 A1 * | 10/2009 | Honnorat | B60N 2/4242 297/216.16 |
| 2010/0230989 A1 * | 9/2010 | Cantor | B60N 2/24 296/68.1 |
| 2013/0328364 A1 * | 12/2013 | Cecinas | B60N 2/20 297/216.1 |
| 2014/0216241 A1 | 8/2014 | Lamparter et al. | |
| 2014/0216242 A1 | 8/2014 | Lamparter et al. | |
| 2014/0339866 A1 | 11/2014 | Olivares | |
| 2016/0047632 A1 | 2/2016 | Berman | |

* cited by examiner

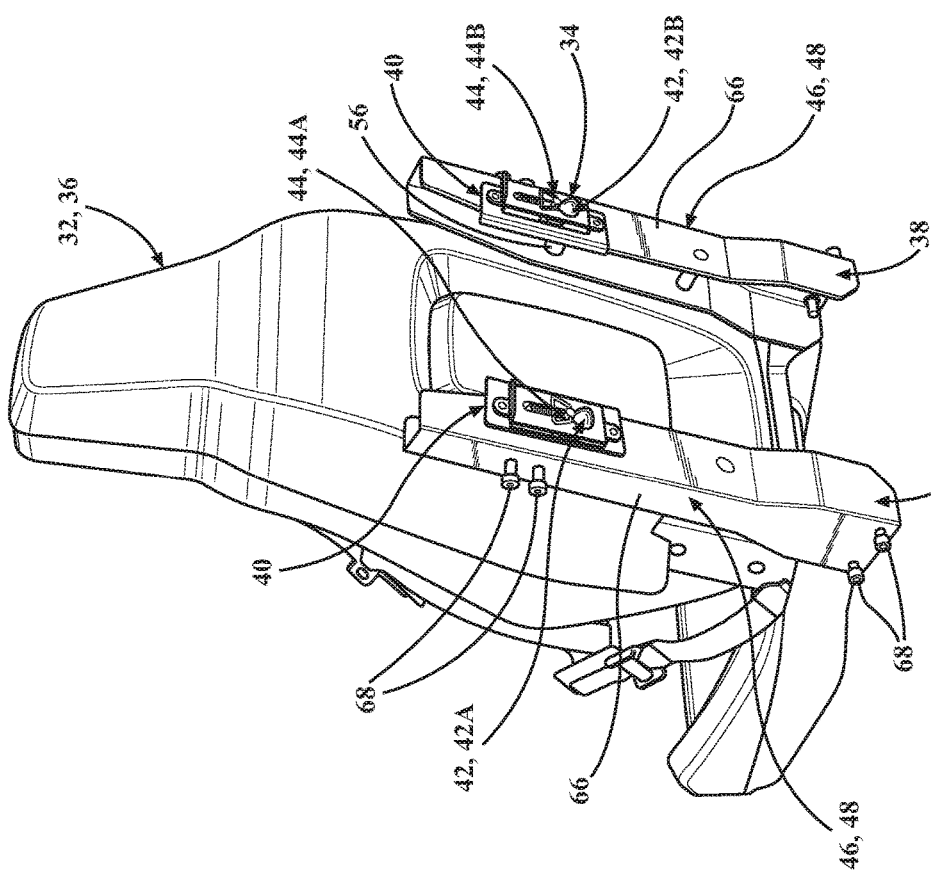

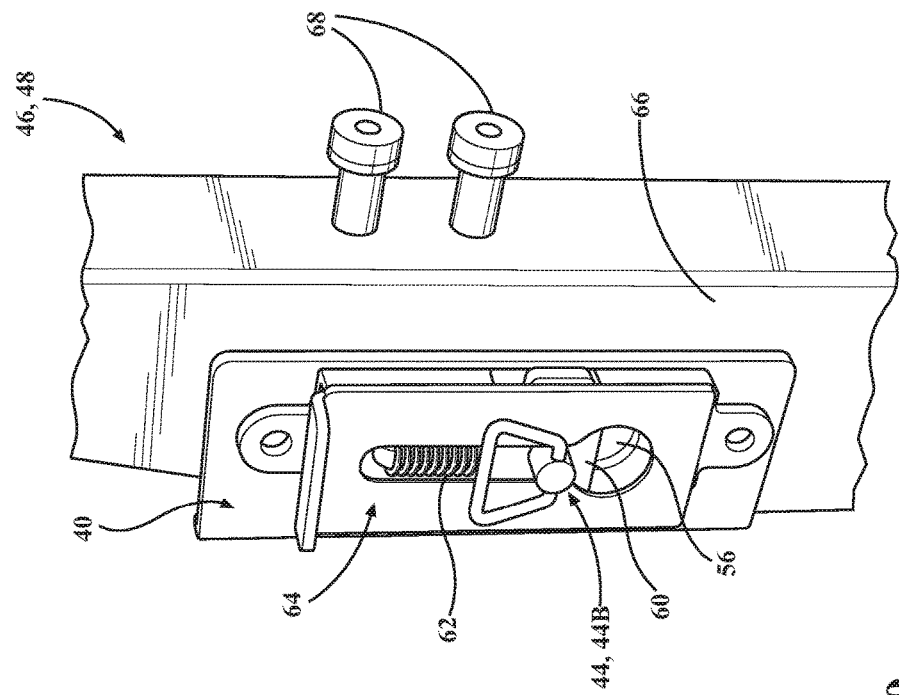
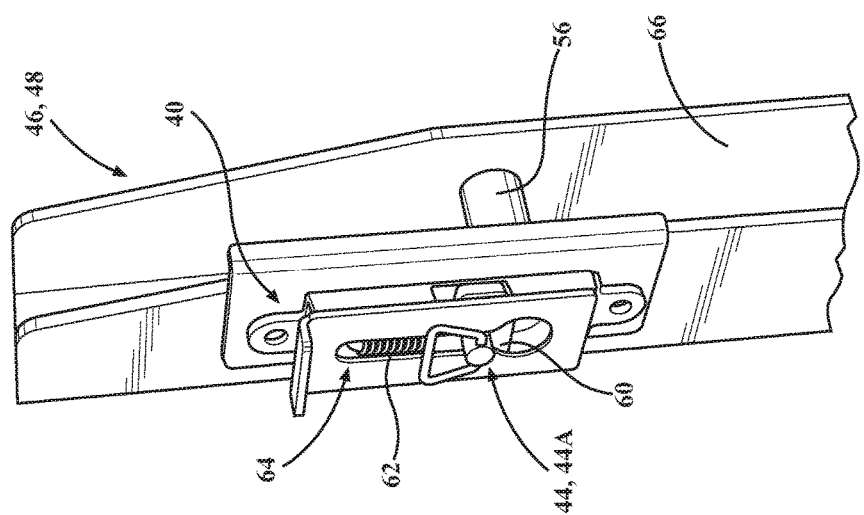
FIG. 9

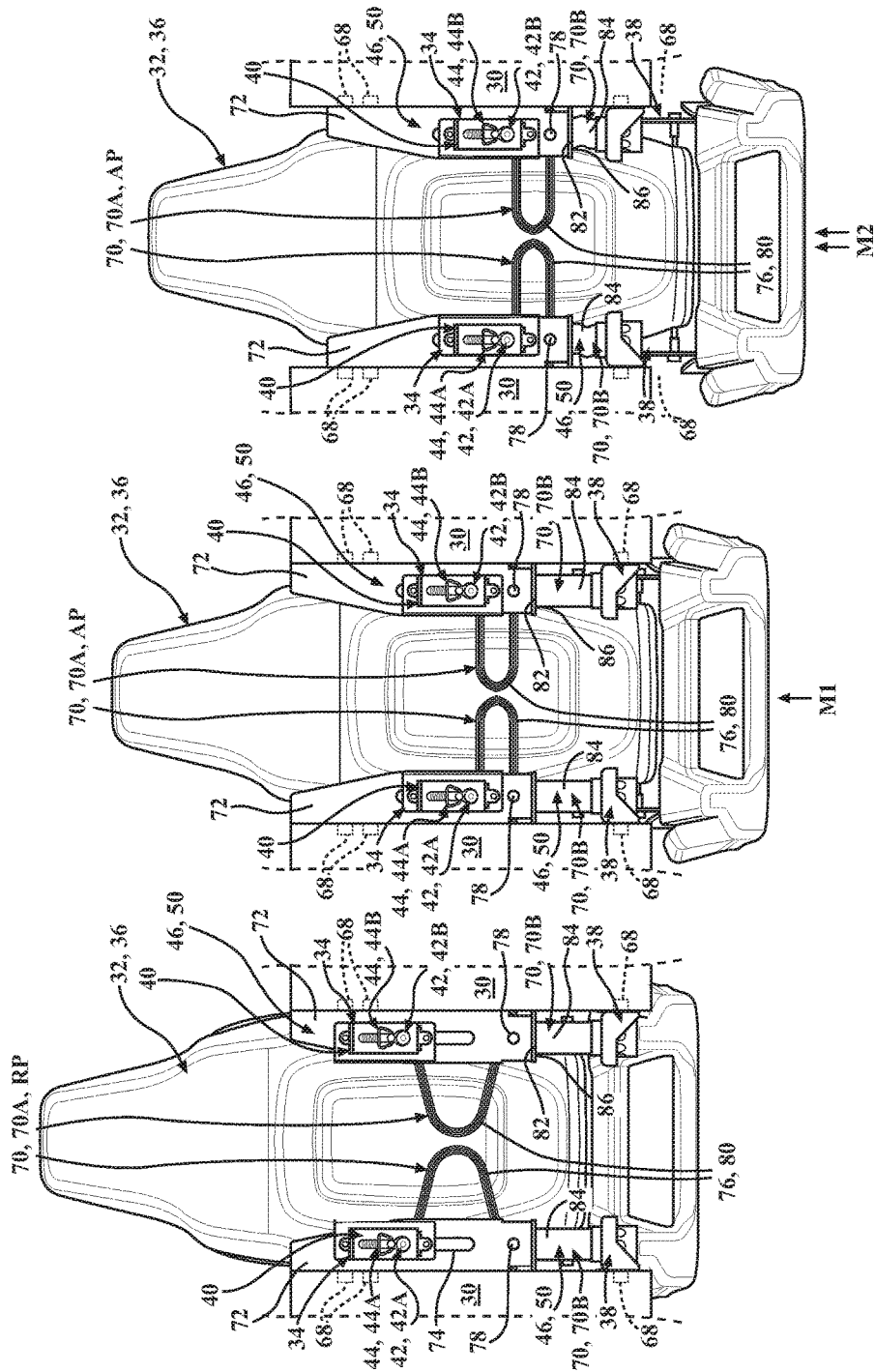

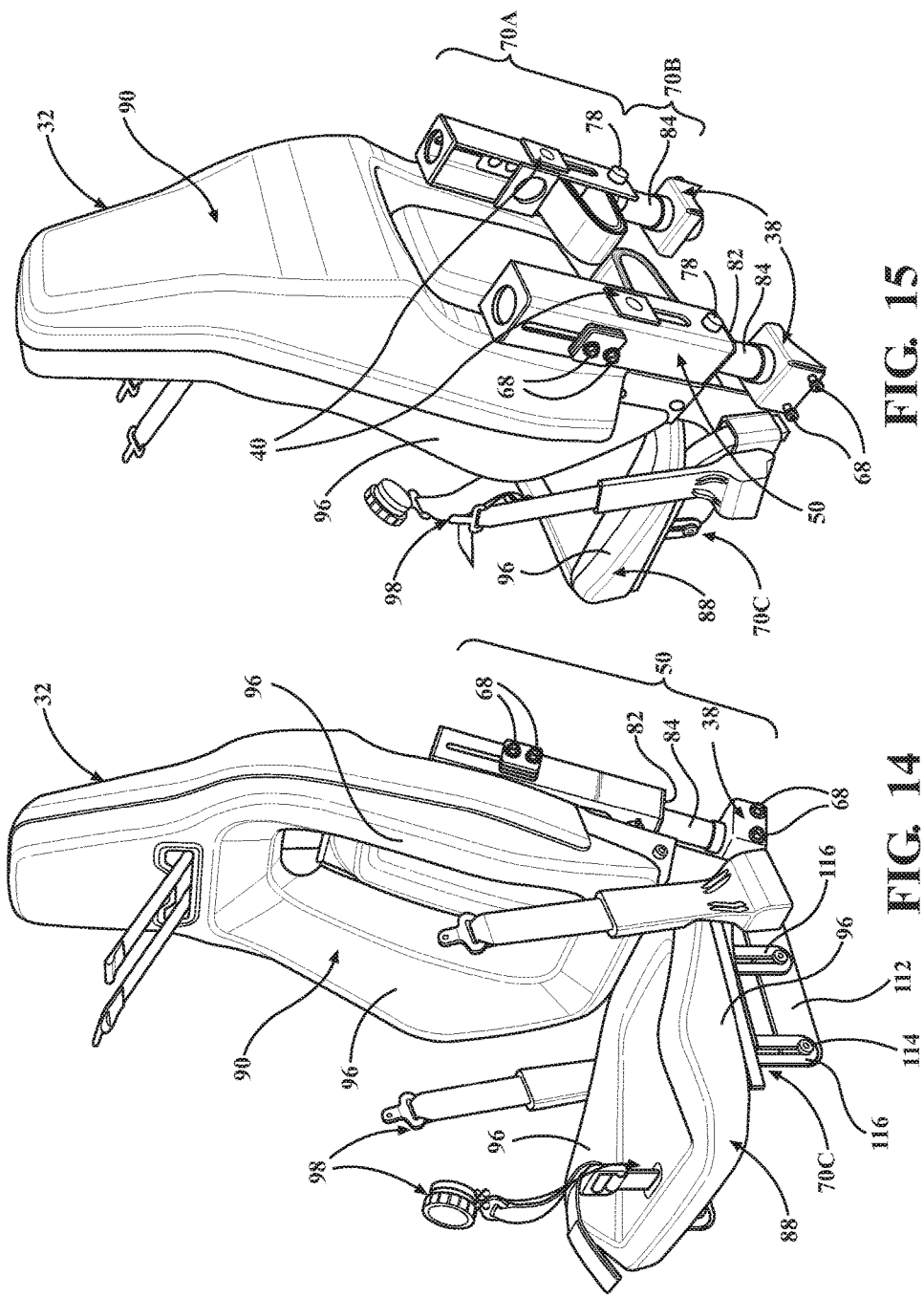

VEHICLE SEAT ASSEMBLY SUPPORT AND SECURING SYSTEMS

CROSS-REFERENCE TO RELATED APPLICATIONS

This patent application is based upon and claims all priority and benefits to U.S. Provisional Patent Application No. 62/211,711 filed on Aug. 29, 2015, and also to U.S. Provisional Patent Application No. 62/146,573 filed on Apr. 13, 2015, each of which are herein incorporated by reference in their entirety.

BACKGROUND OF THE INVENTION

1. Field of the Invention

The present invention relates, generally, to support and securing systems for vehicles and, more specifically, to seat assembly support and securing systems for use with vehicles.

2. Description of the Related Art

Vehicles are widely used in a number of different industries and for a variety of different purposes. Military vehicles, for example, are frequently used for transporting personnel, entering combat areas, patrolling, etc. It will be appreciated that these vehicles may be exposed to energy resulting from detonation of an explosive, whereby forces are subsequently transferred through the vehicle to the occupants, and high impulses through the vehicle can injure the occupants.

It is well known in the related art for military vehicles to be outfitted with armor so as to shield and help protect the vehicle occupants from injury during an explosion. However, the armor is designed to remain rigid during a blast so as to deflect energy and preserve the structural integrity of the vehicle, in particular the portions of the vehicle housing the occupants. Unlike civilian automotive passenger vehicles, which are designed to collapse in predetermined ways so as to absorb impact forces resulting from an automobile crash, the rigid armor on armored military vehicles does not crush and, thus, does not absorb significant amounts energy. As such, while the armor protects the occupants by maintaining structural rigidity of the vehicle, the rigid armor does not deform to absorb energy and, thus, high impulse passes through the vehicle. This high impulse through the vehicle can injure the occupants. For example, if the explosion originates below the military vehicle, an energy show wave can transfer through the floor of the vehicle, whereby the occupant may be harmed if the energy shock wave is transferred directly to the occupant through the vehicle's floor and/or seat(s).

In addition to generating initial forces acting on the vehicle, explosions can also cause the vehicle to become airborne, whereby occupants can also suffer injuries when the vehicle subsequently lands on the ground (commonly referred to in the art as "slam down"). Moreover, armored military vehicles are typically configured so as to optimize available interior space to efficiently accommodate and transport as many personnel and as much equipment as is possible. As such, seats and restraint/safety systems used for accommodating and securing personnel in military vehicle applications are frequently spaced, configured, or otherwise oriented in ways that are incompatible with various conventional civilian automotive safety technology.

For the forgoing reasons, there remains a need in the art for technology that can secure and restrain occupants of armored vehicles in a safe and space-efficient way while, at the same time, providing opportunities for enhances occupant safety by absorbing energy generated by explosions.

SUMMARY OF THE INVENTION

The present invention overcomes the disadvantages in the related art in a securing system for supporting an object within a vehicle and for translating forces occurring between the vehicle and the supported object. The system includes a component adapted to support the object within the vehicle, a mount adapted for attachment to the vehicle for concurrent movement with the vehicle, and an interface member operatively attached to and spaced from the mount. A coupler is operatively attached to one of the component and the interface member, and a receiver is operatively attached to the other of the component and the interface member. The receiver is selectively movable between a first position where the receiver secures the coupler for concurrent movement therewith and a second position where the coupler can be removed from the receiver. A translation module is interposed in force-translating relationship between the mount and the interface member to support the component when the coupler is secured to the receiver in the first position.

In addition, the present invention is directed toward a seat assembly for supporting an occupant of a vehicle and for translating forces occurring between the vehicle and the occupant. The seat assembly includes a seat bottom and a seat back supporting the seat bottom. A first energy absorbing device is operatively attached to the seat back and moves concurrently with the seat back between a rest position and an attenuated position. The first energy absorbing device absorbs at least a portion of a force exerted on the vehicle, moves from the rest position to the attenuated position in response the force reaching a first magnitude, and returns to the rest position in response to the force being below the first magnitude. A second energy absorbing device supports the first energy absorbing device and deforms to absorb at least a portion of the force when the force exceeds a second magnitude greater than the first magnitude.

In addition, the present invention is directed toward a seat assembly for supporting an occupant of a vehicle and for translating forces occurring between the vehicle and the occupant. The seat assembly includes a seat back supported by a riser having a plurality of guide members extending therefrom, and seat bottom supported by a structural member having a plurality of channel members depending therefrom. The guide members of the riser are slidably supported along the channel members of the structural member so as to allow relative movement between the seat back and the seat bottom. An initial energy absorbing device is interposed in force-translating relationship between the riser and the structural member to absorb at least a portion of a force exerted on the vehicle when the force reaches an initial magnitude. The initial energy absorbing device has a cantilevered spring coupled to the riser and engaging the structural member so as to urge the structural member away from the guide members of the riser. A first energy absorbing device is operatively attached to the seat back and absorbs at least a portion of the force exerted on the vehicle when the force reaches a first magnitude greater than the initial magnitude. A second energy absorbing device supports the first energy absorbing device and is adapted for attachment to the vehicle. The second energy absorbing device plastically deforms to absorb at least a portion of the force when the force exceeds a second magnitude greater than the first magnitude.

In this way, the securing systems and seat assemblies of the present invention provide opportunities for improved occupant safety in connection with vehicles while, at the same time, reducing the cost and complexity of manufacturing, assembling, using, and servicing occupant seat assemblies having enhanced features and improved functionality.

BRIEF DESCRIPTION OF THE DRAWINGS

Advantages of the present invention will be readily appreciated, as the same becomes better understood by reference to the following detailed description when considered in connection with the accompanying drawings.

FIG. 6 is a perspective view of one embodiment of the securing system showing the couplers of the seat assembly of FIG. 5 secured to receivers of respective non-EA kits adapted for suspended attachment to the vehicle of FIGS. 1-3.

FIG. 9 is an enlarged partial perspective view of the non-EA kits of FIG. 7 showing additional detail of the receivers.

FIG. 11A is a back-side view of the seat assembly and EA kits of the securing system of FIG. 10 with the EA kits shown attached to portions of the vehicle of FIGS. 1-3 and with the first energy absorbing device shown in a rest position.

FIG. 11B is another back-side view of the seat assembly, EA kits, and vehicle portions of FIG. 11A with the first energy absorbing device shown in an attenuated position.

FIG. 11C is yet another back-side view of the seat assembly, EA kits, and vehicle portions of FIGS. 11A-11B with the first energy absorbing device shown in the attenuated position and with the second energy absorbing device shown plastically deformed.

FIG. 14 is a perspective view of a suspended occupant seat assembly as depicted in FIGS. 1-3 shown having initial, first, and second energy absorbing devices according to another embodiment of the present invention.

FIG. 15 is another perspective view of the seat assembly of FIG. 14.

DETAILED DESCRIPTION OF THE INVENTION

Figure 1:
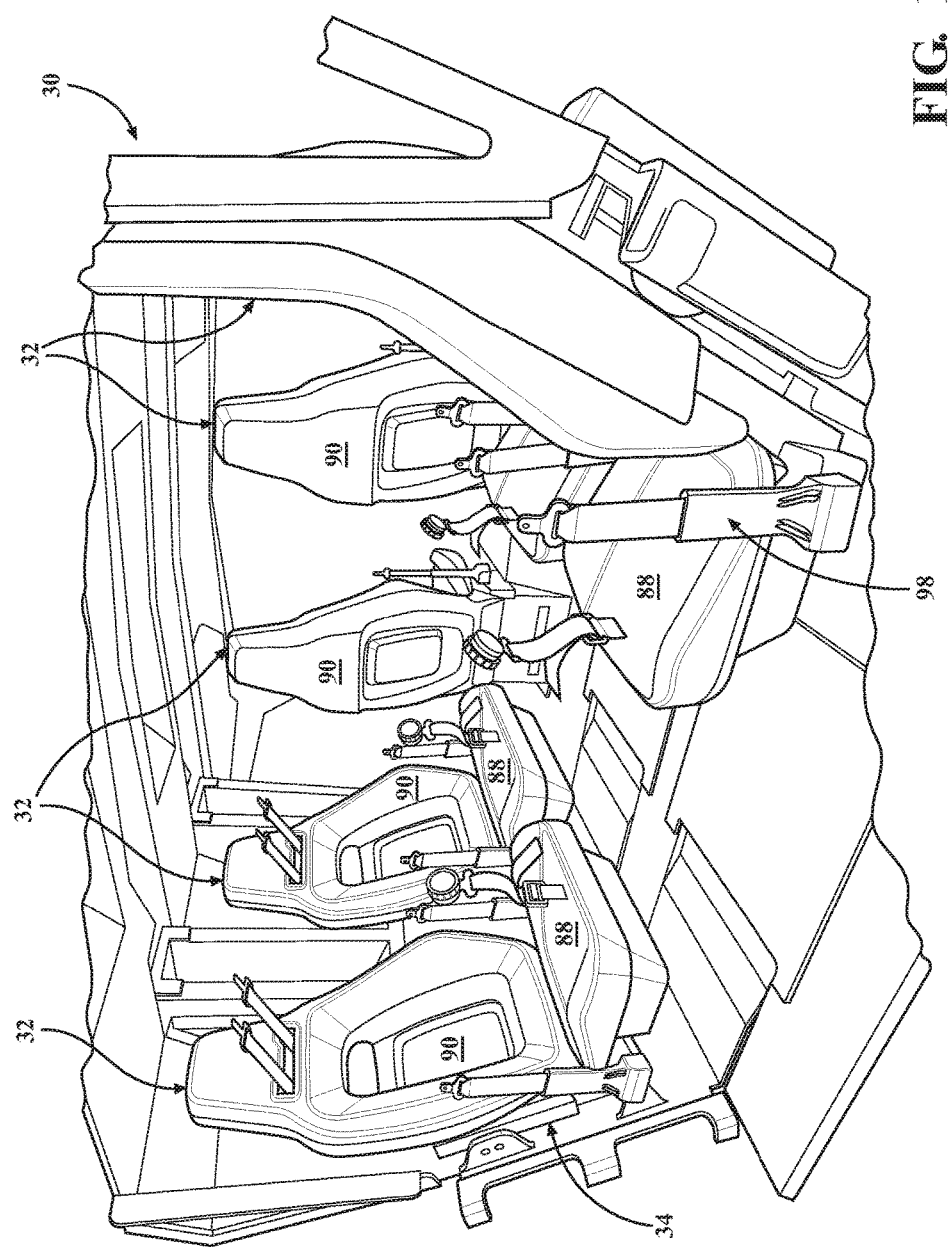
FIG. 1 is a perspective view of a portion of an interior of a vehicle having a plurality of floor-mounted and suspended occupant seat assemblies according to one embodiment of the present invention.
Figure 2:
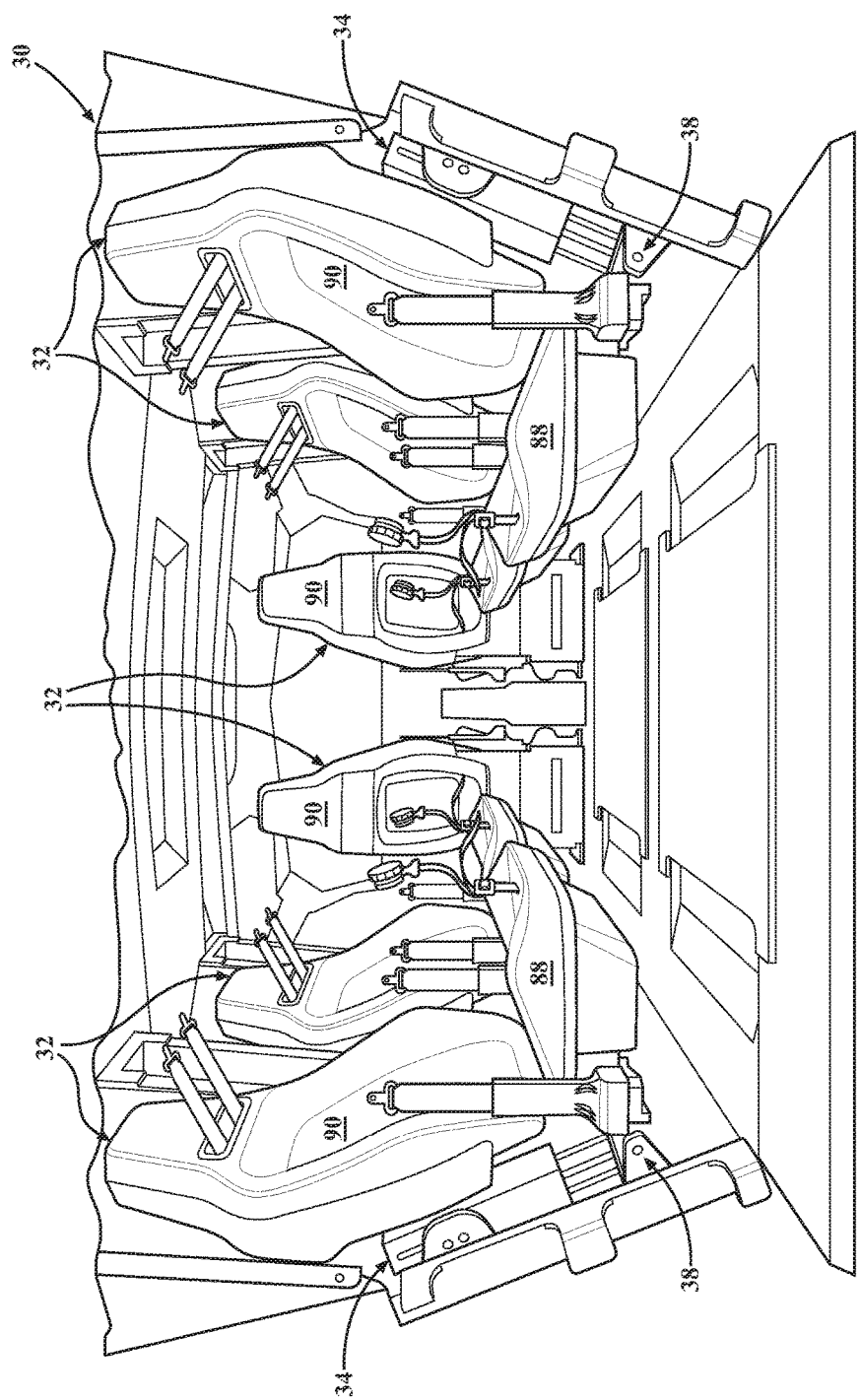
FIG. 2 is another perspective view of the vehicle and seat assemblies of FIG. 1.
Figure 3:
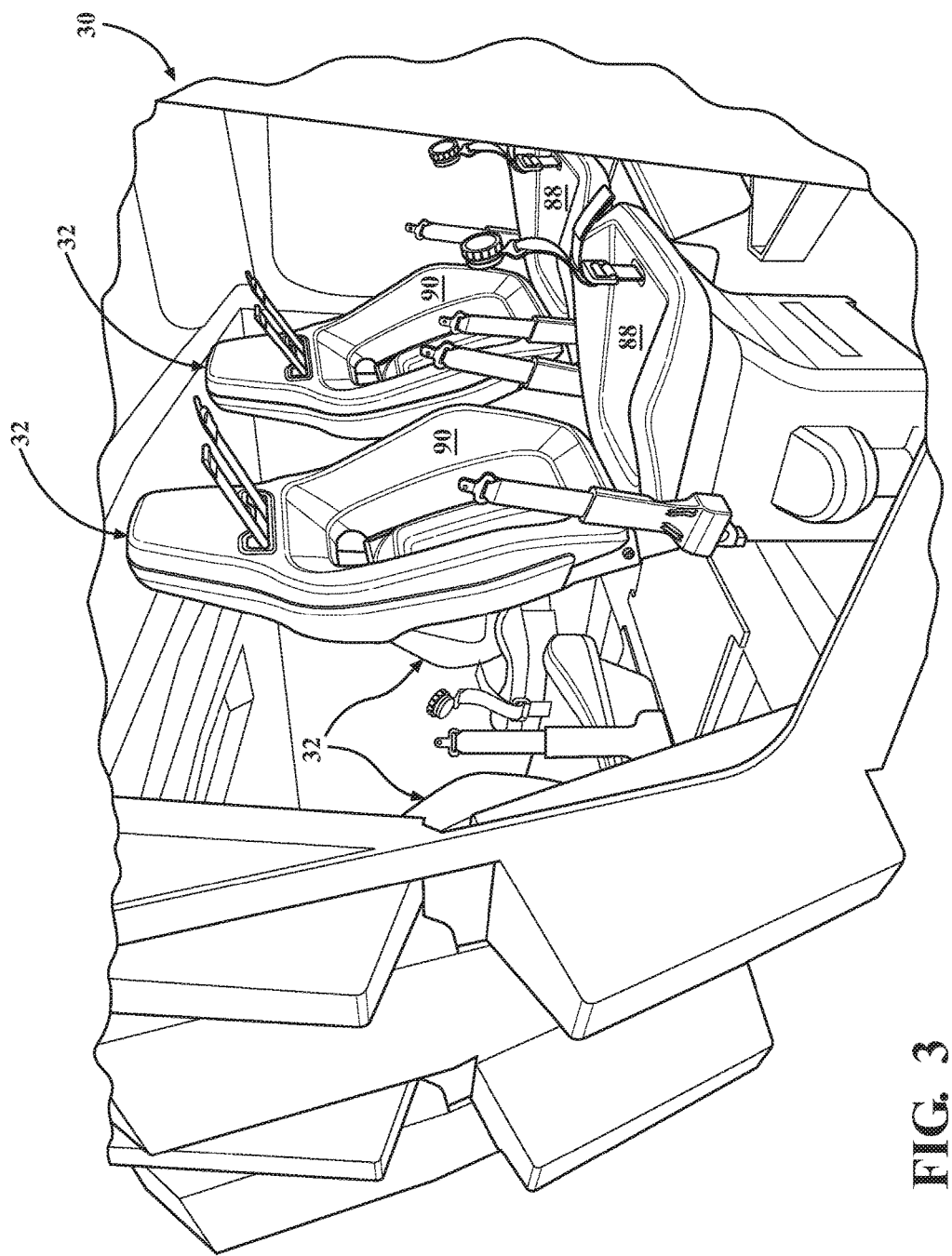
FIG. 3 is yet another perspective view of the vehicle and seat assemblies of FIGS. 1-2.

With reference to the drawings, wherein like numerals indicate like parts throughout the several views, a portion of a vehicle is generally indicated at 30 in FIGS. 1-3 and 11A-11C. The vehicle 30 is equipped with a plurality of occupant seat assemblies, generally indicated at 32, which are secured to portions of the vehicle 30, according to various embodiment of the present invention. More specifically, and as is described in greater detail below, the vehicle 30 illustrated in FIGS. 1-3 includes "suspended" or "wall-mounted" seat assemblies 32 as well as "floor-mounted" seat assemblies 32 according to various embodiments of the present invention. Here, the "floor-mounded" seat assemblies 32 are operatively attached to a floor of the vehicle 30, and the "suspended" seat assemblies 32 are configured so as to be secured to walls or other portions of the vehicle 30, such as using a modular securing system, generally indicated at 34, according to certain embodiments of the present invention and as described in greater detail below. While FIGS. 1-3 depict the vehicle 30 as being equipped with a plurality of both "suspended" and "wall mounted" seat assemblies 32, those having ordinary skill in the art will appreciate that the vehicle 30 could include any suitable number of either type of seat assembly without departing from the scope of the present invention.

The seat assemblies 32 are configured to be mounted in the vehicle 30, such as a military vehicle, and are used to accommodate and secure an occupant, and to translate forces occurring between the vehicle 30 and the occupant, as described in greater detail below. While the vehicle 30 described herein is a military vehicle, those having ordinary skill in the art will appreciate that the vehicle 30 could be of any suitable type, both military and non-military, without departing from the scope of the present invention. By way of non-limiting example, the vehicle 30 could be adapted for civilian, commercial, industrial, or law enforcement use on land, water, or in the air. Moreover, irrespective of the type of vehicle 30, the seat assembly 32 can be used in any suitable location of or within the vehicle 30, (i.e., driver seat, front passenger seat, rear seat, etc.).

Figure 10:
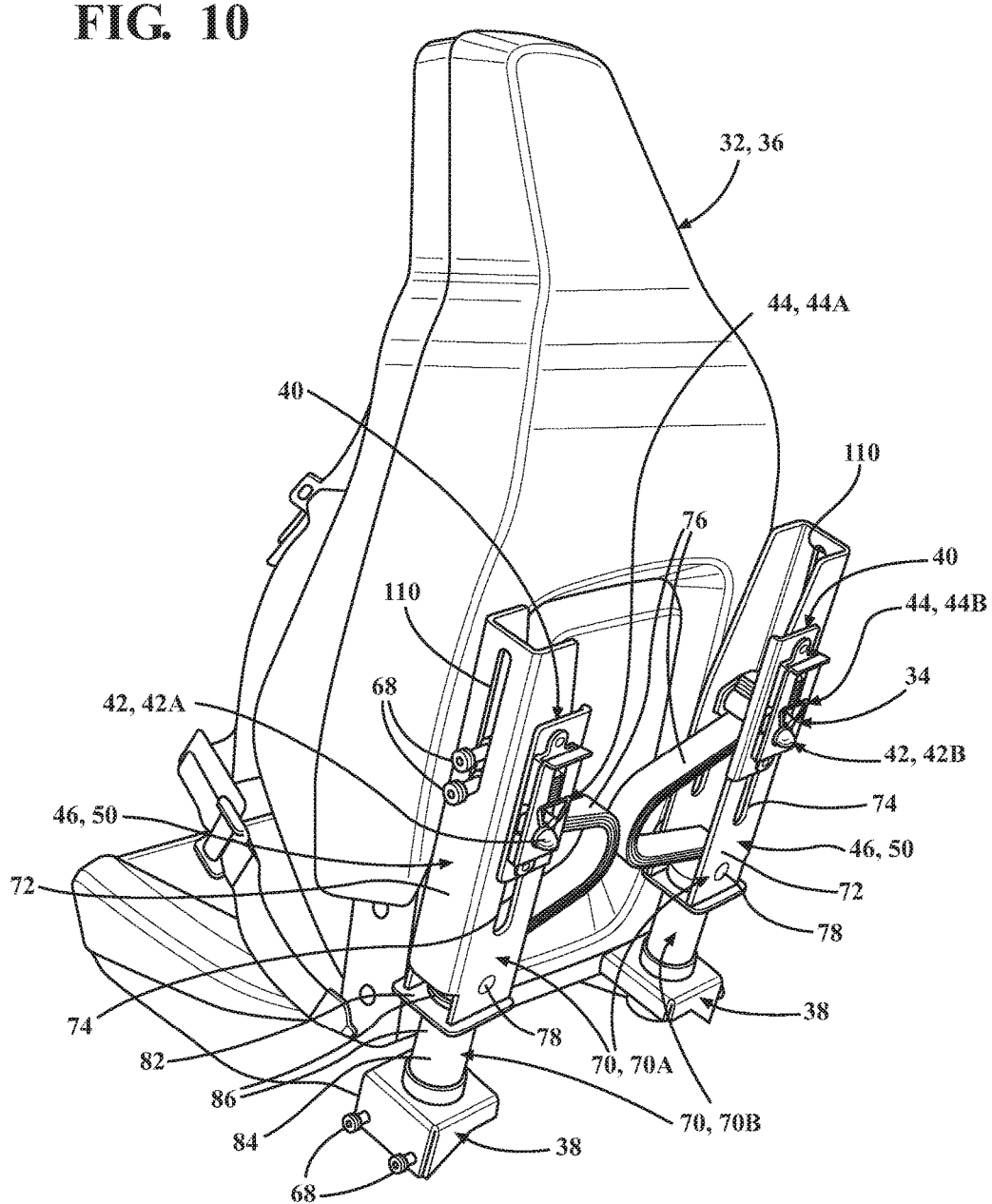
FIG. 10 is a perspective view of another embodiment of the securing system showing the couplers of the seat assembly of FIGS. 4-5 secured to receivers of respective EA kits adapted for suspended attachment to the vehicle of FIGS. 1-3, the EA kits each shown having first and second energy absorbing devices according to one embodiment of the present invention.
Figures 12A, 12B:
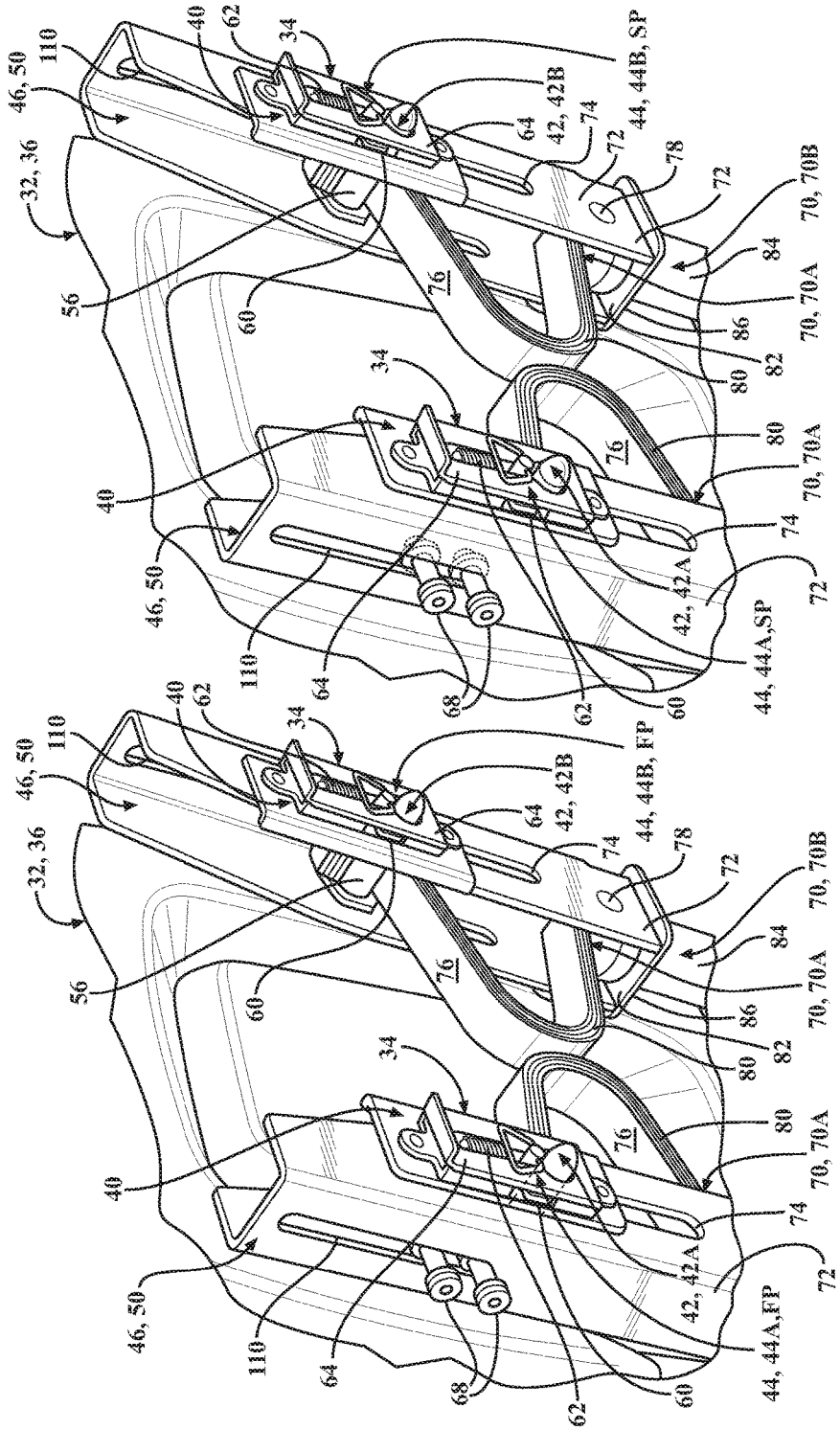
FIG. 12A is a partial perspective view of the seat assembly and the EA kits of the securing system depicted in FIG. 10 with the receivers shown in a first position secured to the couplers.
FIG. 12B is another partial perspective view of the seat assembly and the EA kits of the system depicted in FIG. 10 with the receivers shown in a second position released from the couplers.

Referring now to FIGS. 4-13, certain components of the securing system 34 according to one embodiment of the present invention are shown. As noted above, the securing system 34 is provided for supporting an object within the vehicle 30 and for translating forces occurring between the vehicle 30 and the supported object. To that end, as best shown in FIGS. 6, 10, and 14, the securing system 34 generally includes a component 36, a mount 38, an interface member 40, a coupler 42, a receiver 44, and a translation module 46. The component 36 is adapted to support the object within the vehicle 30. The mount 38 is adapted for attachment to the vehicle 30 for concurrent movement with the vehicle 30. The interface member 40 is operatively attached to and is spaced from the mount 38. The coupler 42 is operatively attached to one of the component 36 and the interface member 40 and the receiver 44 is operatively attached to the other of the component 36 and the interface member 40. The receiver 44 is selectively movable between a first position FP (see FIG. 12A) where the receiver 44 secures the coupler 42 for concurrent movement therewith, and a second position SP (see FIG. 12B) where the coupler 42 can be removed from the receiver 44. The translation module 46 is interposed in force-translating relationship between the mount 38 and the interface member 40 to support the component 36 when the coupler 42 is secured to the receiver 44 in the first position FP. The component 36, the mount 38, the interface member 40, the coupler 42, the receiver 44, and the translation module 46 will each be described in greater detail below.

As noted above, the component 36 is adapted to support the object within the vehicle 30 and, in the representative embodiment illustrated throughout the drawings, is realized as a seat assembly 32 configured to support an occupant within the vehicle 30. However, as will be appreciated from the subsequent description of the securing system 34 below, the component 36 could be of any suitable type or configuration sufficient to support any suitable type of object in any suitable orientation within the vehicle 30, without departing from the scope of the present invention. By way of non-limiting example, while the component 36 is depicted as a seat assembly 32 with the object realized as a seated occupant, it is conceivable that the component 36 could be a stretcher and the object could be an injured occupant laying on the stretcher (not shown, but generally known in the related art). By way of further non-limiting example, the component 36 could also be configured as a tray, shelf, a bed, etc. and the object could be realized as cargo or luggage secured to the tray or shelf (not shown, but generally known in the related art). Thus, those having ordinary skill in the art will appreciate that the securing system 34 may be used to releasably secure components 36 of a number of different types and/or configurations which, in turn, may be adapted to support any suitable type of object within the vehicle 30. The seat assembly 32 will be described in greater detail below.

As is described in greater detail below, the translation module 46 of the securing system 34 can be configured as either a non-energy absorbing kit (a "non-EA kit"), generally indicated at 48 (see FIGS. 6-9), or as an energy absorbing kit (an "EA kit"), generally indicated at 50 (see FIGS. 10-13). Here, the non-EA kit 48 generally secures the component 36 to the vehicle for concurrent movement such that forces acting on the vehicle 30 are transferred to the component 36, and the EA kit 50 is configured to at least partially attenuate forces acting on the vehicle 30 to reduce the forces applied or otherwise transferred to the component 36. Those having ordinary skill in the art will appreciate that military vehicles 30, for example, may be subjected to explosions in or on the ground or in the air adjacent to the vehicle 30. Here, explosions can also cause the vehicle 30 to become airborne and/or flip sideways, forward, and/or rearward. Thus, it will be appreciated that the implementation of EA kits 50 is advantageous in certain applications because energy transmitted through the vehicle 30 which would otherwise be subsequently translated to the component 36 can be absorbed or otherwise at least partially attenuated to reduce force transferred to the object. Moreover, as is described in greater detail below, the modularity afforded by the securing system 34 allows the component 36 to be removed from one vehicle 30 when the receiver 44 is in the second position SP, whereby the component 36 can be subsequently secured to a different vehicle 30 when the receiver 44 is in the first position FP. Here, it will be appreciated that certain types of vehicles 30 could be outfitted with EA kits 50, and other types of vehicles 30 could be outfitted with non-EA kits 48. Similarly, it will be appreciated that a single vehicle 30 could be outfitted with both EA kits 50 and non-EA kits 48, depending on application requirements. Both the non-EA kits 48 and the EA kits 50 will be described in greater detail below.

As noted above, the coupler 42 is operatively attached to one of the component 36 and the interface member 40, and the receiver 44 is operatively attached to the other of the component 36 and the interface member 40. In the representative embodiment illustrated throughout FIGS. 4-13, the coupler 42 of the securing system 34 is further defined as a first coupler 42A and a second coupler 42B, each of which are operatively attached to the component 36 and are spaced from each other (see FIG. 5). Thus, because the couplers 42A, 42B are operatively attached to the component 36, the receiver 44 is operatively attached to the interface member 40 which, in turn, is operatively attached to the translation module 46 spaced from the mount 38 (see FIGS. 7-12B). More specifically, in this embodiment, the receiver 44 is further defined as a first receiver 44A and a second receiver 44B, with each receiver 44A, 44B being operatively attached to a respective interface member 40 of a respective translation module 46, whereby the receivers 44A, 44B cooperate to secure the couplers 42A, 42B when the receivers 44A, 44B are each the first position FP.

Thus, a pair of translation modules 46 are provided here to secure the component 36 and are interposed between respective mounts 38 and corresponding interface members 40 with a receiver 44 operatively attached to each interface member 40. However, as will be appreciated from the subsequent description of the coupler 42 and the receiver 44 below, the arrangement of the coupler 42 and the receiver 44 could be interchanged without departing from the scope of the present invention. Thus, the component 36 could be provided with one or more receivers, and one or more couplers could be operatively attached to respective interface members (not shown).

As noted above, coupler 42 of the component 36 is configured to be secured by the receiver 44 irrespective of the configuration of the translation module 46. Thus, for the purposes of clarity and consistency, in the description that follows, the same reference numerals are used to describe and illustrate the structural features of the coupler 42 and the receiver 44 in connection with the non-EA kits 48 (for example, as shown in FIGS. 6-9) as well as the EA kits 50 (for example, as shown in FIGS. 10-13).

Figure 5:
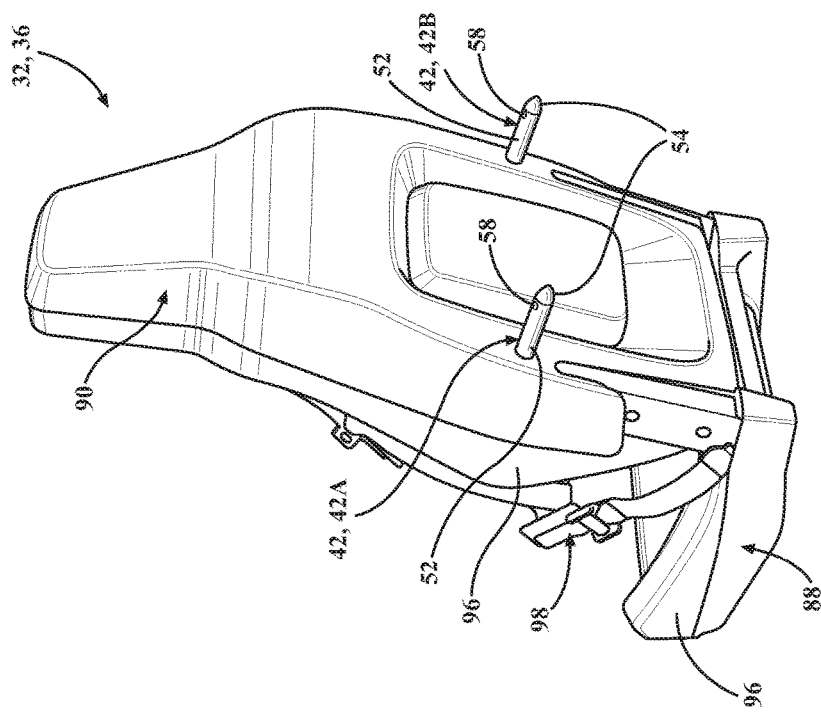
FIG. 5 is another perspective view of the seat assembly component of FIG. 4 shown having a pair of couplers according to one embodiment t of the present invention.
Figure 13:
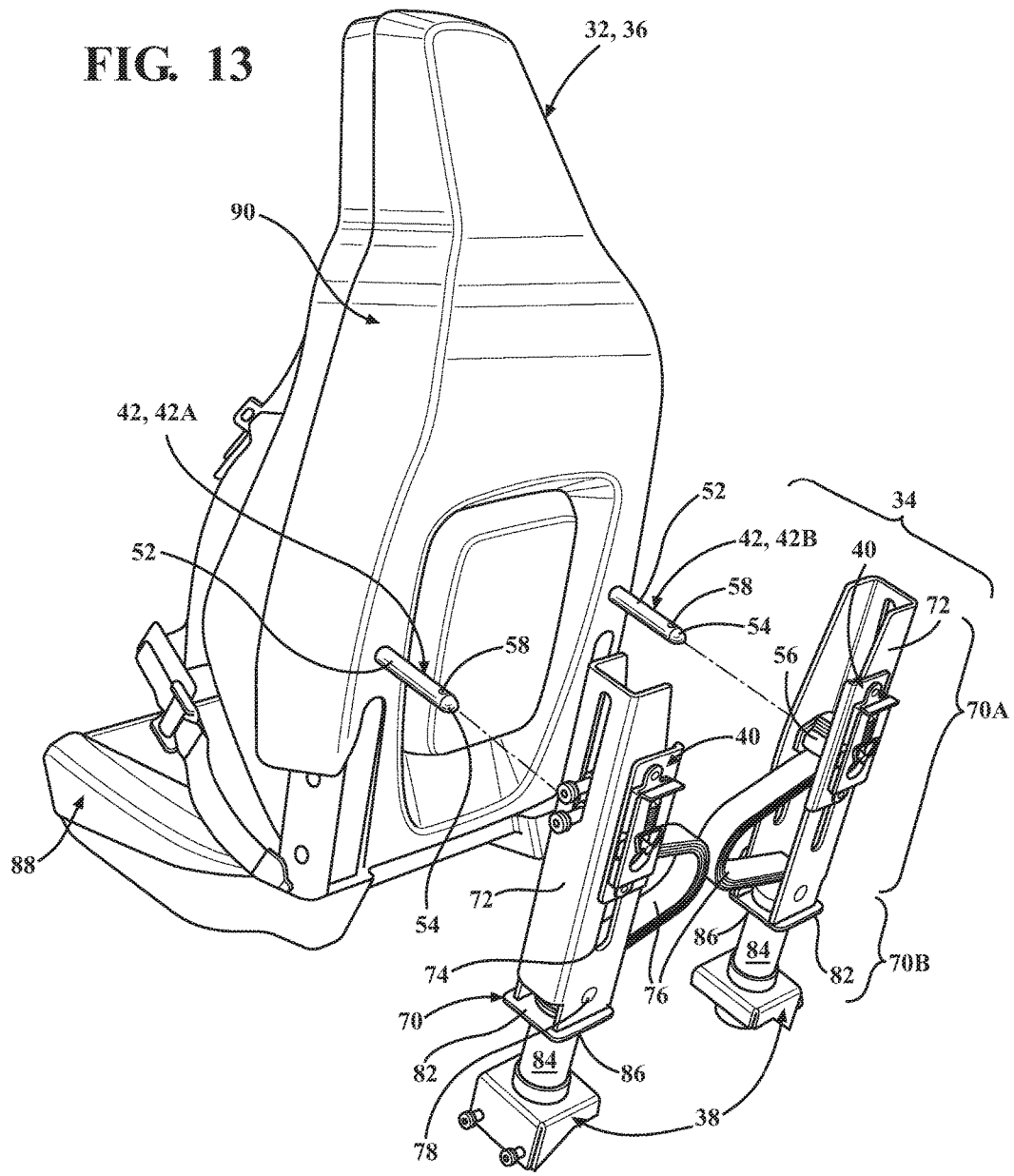
FIG. 13 is an exploded partial perspective view of the seat assembly and the EA kits of the securing system of FIGS. 10-12B with the seat assembly and couplers shown removed from the receivers of the EA kits.

As best shown in FIGS. 5 and 13, the coupler 42 has a cylindrical body, generally indicated at 52, which extends from one of the component 36 and the interface member 40 to a tapered end 54, and the receiver 44 has a sleeve 56 operatively attached to the other of the component 36 and the interface member 40 arranged to receive at least a portion of the tapered end 54 of the cylindrical body 52 when the receiver 44 is in the first position FP. In the representative embodiment illustrated herein, the component 36 is a seat assembly 32 with a pair of cylindrical bodies 52 extending therefrom to respective tapered ends 54 (see FIGS. 5 and 13), and corresponding sleeves 54 are operatively attached to respective interface members 40 which, in turn, are operatively attached to translation modules 46 which can be configured as non-EA kits 48 (see FIGS. 7-9) or as EA kits 59 (see FIG. 12A-13). In one embodiment, the coupler 42 has a notch 58 defined in the cylindrical body 52 adjacent the tapered end 54 (see FIGS. 5 and 12A-13), and the receiver includes a latch 60 arranged to engage the notch 58 when the receiver 44 is in the first position FP to restrict axial movement of the cylindrical body 52 of the coupler 42 along the sleeve 56 of the receiver 44 (see FIG. 12A) and to disengage the notch 58 when the receiver 44 is in the second position SP to allow axial movement of the cylindrical body 52 of the coupler 42 along the sleeve 56 of the receiver 44 (see FIG. 12B). Thus, when the receiver 44 is in the second position SP with the latch 60 disengaged from the notch 58, the coupler 42 can be removed from the receiver 44 so as to effect removal of the component 36 from the vehicle 30, as noted above.

In one embodiment, the receiver 44 further includes a biasing device 62 disposed in force-translating engagement with the latch 60 and arranged so as to urge the latch 60 into engagement with the notch 58 of the coupler 42. In the representative embodiment illustrated throughout the drawings, the receiver 44 includes a receiver frame 64 which supports the latch 60 and the biasing device 62 for relative movement with respect to the sleeve 56 so as to facilitate movement of the receiver 44 between the first position FP and the second positions SP (compare FIGS. 12A and 12B). Here, both the notch 58 of the coupler 42 and the latch 60 of the receiver 44 have a generally rectangular profile, and the biasing device 62 is realized as a compression spring which urges the latch 60 into the correspondingly-shaped notch 58. However, those having ordinary skill in the art will appreciate the coupler 42 and/or receiver 44 could include any suitable number of components or structural features which may be configured, arranged, and/or disposed in any suitable way sufficient to secure the coupler 42 to the receiver 44 for concurrent movement, without departing from the scope of the present invention.

Figure 7:
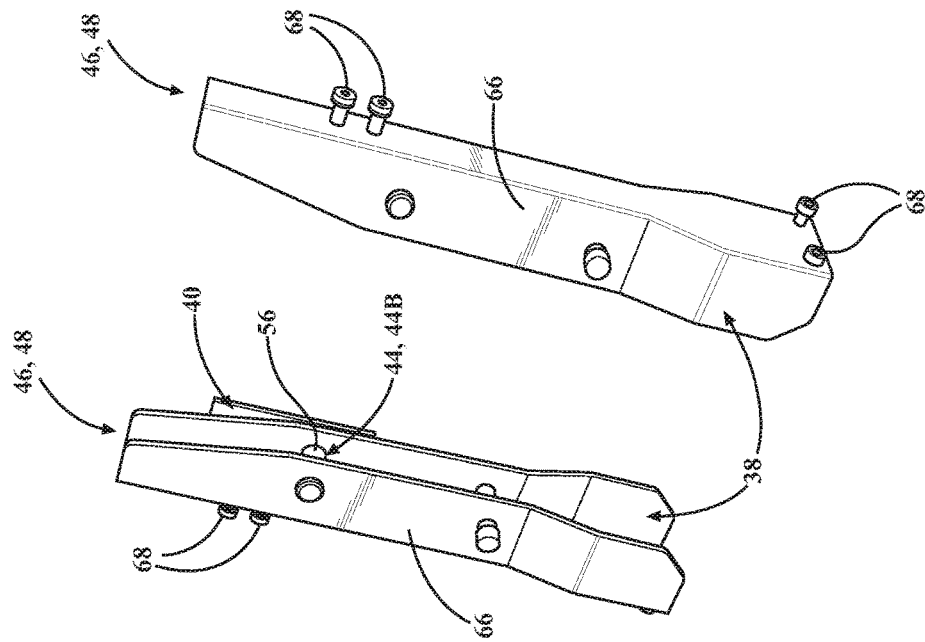
FIG. 7 is a perspective view of the non-EA kits of FIG. 6 shown without the couplers or seat assembly.
Figure 8:
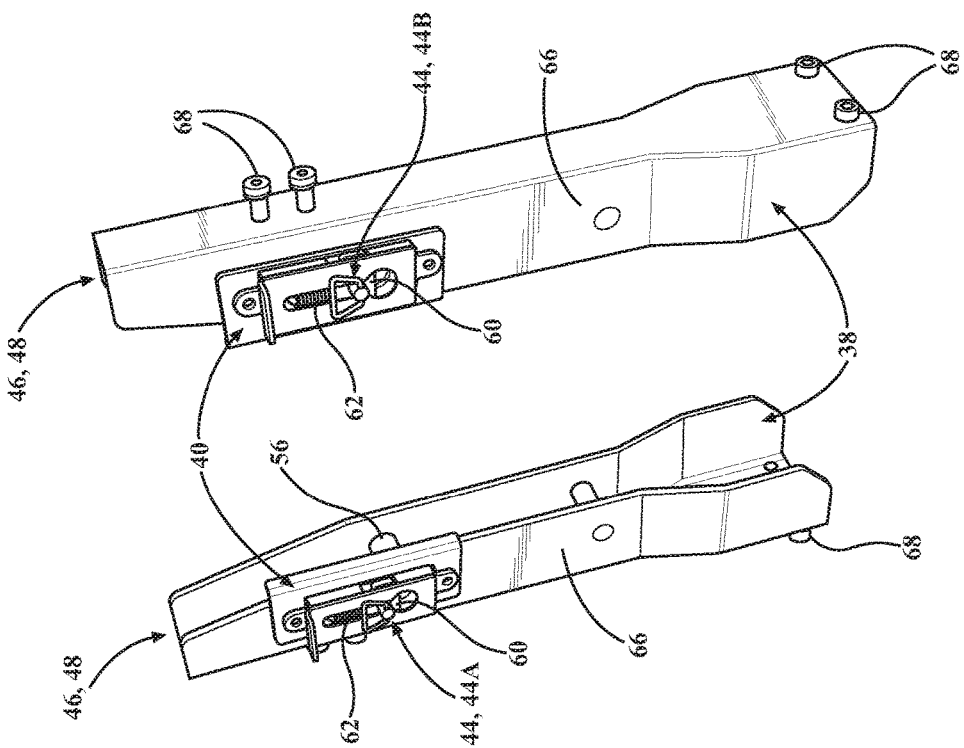
FIG. 8 is another perspective view of the non-EA kits of FIG. 7.

Referring now to FIGS. 7-9, in one embodiment, the translation module 46 of the securing system 34 includes a brace, generally indicated at 66, which is coupled to the mount 38 and to the interface member 40. Here, the brace 66 is configured to effect translation of force by transferring at least a portion of the force exerted on the vehicle 30 to the component 36. Thus, in this embodiment, the mount 38, the interface member 40, the receiver 44, and the brace 66 of the translation module 46 cooperate to define the non-EA kit 48 which is adapted for attachment to the vehicle 30 as noted above. Moreover, in the representative embodiment illustrated in FIGS. 7-9, a pair of non-EA kits 48 cooperate to support the component 36 when one of the couplers 42 are respectively secured to one of the receivers 44 in the first position FP, as noted above. As shown in FIGS. 7 and 8, the brace 66 of the translation module 46 has a generally "C-shaped" elongated profile and is formed integrally with and extends between the interface member 40 and the mount 38 such that the brace 66 of the translation module 46 defines both the interface member 40 and the mount 38. Here, the mount 38 is defined by the portion of the brace 66 which is adapted to attach to the vehicle 30, such as with one or more fasteners 68, and the interface member 40 is realized as a bracket spaced from the mount 38 which is fixed to both the brace 66 and also to the sleeve 56 of the receiver 44 for concurrent movement.

Those having ordinary skill in the art will appreciate that the mount 38, the interface member 40, and the brace 66 of the translation module 46 could define the non-EA kit 48 in a number of different ways, using any suitable number of components which cooperate to effect translation of force between the vehicle 30 and the component 36, without departing from the scope of the present invention. By way of non-limiting example, the brace 66 could be formed as a separate component from the mount 38 and/or the interface member 40, and the brace 66 could be welded to the mount 38 and/or the interface member 40. Similarly, while the mount 38 is depicted as being adapted to secure to the vehicle 30 using fasteners 68, those having ordinary skill in the art will appreciate that the mount 38 could be configured in any suitable way sufficient to attach to the vehicle 30 for concurrent movement, without departing from the scope of the present invention. Moreover, while the interface member 40 is interposed between and fixed to both the brace 66 and the sleeve 56 of the receiver 44, those having ordinary skill in the art will appreciate that the interface member 40 could be configured in any suitable way sufficient to secure the receiver 44 to the brace 66 spaced from the mount 38, without departing from the scope of the present invention.

Referring now to FIGS. 10-13, in one embodiment, the translation module 46 of the securing system 34 includes at least one energy absorbing device, generally indicated at 70, which is coupled to the mount 38 and to the interface member 40. Here, the energy absorbing device 70 is configured to effect translation of force by at least partially attenuating the force exerted on the vehicle 30 to reduce the forces applied to the component 36. Thus, in this embodiment, the mount 38, the interface member 40, the receiver 44, and the energy absorbing device 70 of the translation module 46 cooperate to define the EA kit 50 which is adapted for attachment to the vehicle 30 as noted above. Moreover, in the representative embodiment illustrated in FIGS. 10-13, a pair of EA kits 50 cooperate to support the component 36 when one of the couplers 42 are respectively secured to one of the receivers 44 in the first position FP, as noted above.

In one embodiment, the energy absorbing device 70 of the translation module 46 is further defined as a first energy absorbing device 70A operatively attached to the interface member 40, and a second energy absorbing device 70B supporting the first energy absorbing device 70A and coupled to the mount 38. As shown in FIGS. 11A-11C, the first energy absorbing device 70A and the component 36 move concurrently between a rest position RP (see FIG. 11A) and an attenuated position AP (see FIG. 11B). Here, the first energy absorbing device 70A absorbs at least a portion of a force exerted on the vehicle 30, moves from the rest position RP to the attenuated position AP in response to the force reaching a first magnitude M1, and returns to the rest position RP in response to the force being below the first magnitude M1. The second energy absorbing device 70B at least partially plastically deforms to absorb at least a portion of the force when the force exceeds a second magnitude M2 greater than the first magnitude M1 (compare FIG. 11C to FIG. 11B). Those having ordinary skill in the art will appreciate that both the first energy absorbing device 70A and the second energy absorbing device 70B can be designed such that the first magnitude M1 and the second magnitude M2 could have any suitable numerical measurement or range of numerical measurements. For example, the first magnitude M1 of the force (such as the magnitude that moves the first energy absorbing device 70A from the rest position RP) may be between 100 G and 300 G, and the second magnitude M2 of the force (such as the magnitude that initiates plastic deformation of the second energy absorbing device 70B) may be between 300 G and 550 G.

As noted above, the first energy absorbing device 70A is operatively attached to the interface member 40 and is supported by the second energy absorbing device 70B. To that end, in one embodiment, the first energy absorbing device 70A includes a housing, generally indicated at 72, which is operatively attached to and extends between the interface member 40 and the second energy absorbing device 70B. Here, a track 74 is defined in the housing 72 and the interface member 40 is slidably supported along the track 74 for movement between the rest position RP and the attenuated position AP. More specifically, as shown best in FIGS. 12A-13, the interface member 40 in this embodiment is fixed to the sleeve 56 of the receiver 44 which, in turn, is slidably supported within the track 74 such that the receiver 44 and the interface member 40 move concurrently with the sleeve 56 as the first energy absorbing device 70A moves between the rest position RP and the attenuated position AP.

In the representative embodiment illustrated herein, the first energy absorbing device 70A includes a leaf spring assembly, generally indicated at 76, which is disposed in force-translating relationship between the housing 72 and the interface member 40 and is arranged so as to urge the interface member 40 away from the second energy absorbing device 70B. To that end, a pin 78 is operatively attached to the housing 72 spaced below the track 74, and the leaf spring assembly 76 is interposed between and engages the pin 78 and the sleeve 56 of the receiver 44 such that the sleeve 58 is biased away from the pin 78. Here, the housing 72 of the first energy absorbing device 70A of the translation module 46 has a generally "C-shaped" elongated profile through which the pin 78 is arranged, and in which the leaf spring assembly 76 is supported via the pin 78 and the sleeve 58, as noted above. In one embodiment, the leaf spring assembly 76 includes a plurality of leaf spring elements 80 each having a generally U-shaped controlled-shaped curved profile. Here, the leaf spring elements 80 cooperate to effect movement between the rest position RP and the attenuated position AP in response to forces exerted on the vehicle exceeding the first magnitude M1, as noted above. Those having ordinary skill in the art will appreciate that the first energy absorbing device 70A could employ any suitable number of components, arranged or configured in any suitable way sufficient to move from the rest position RP to the attenuated position AP to reduce forces applied to the component 36, without departing from the scope of the present invention.

As noted above, the second energy absorbing device 70B is coupled to the mount 38, supports the first energy absorbing device 70A, and is configured to plastically deform in response to the force exceeding the second magnitude M2. To that end, in one embodiment, the second energy absorbing device 70B includes a collar 82 operatively attached to the first energy absorbing device 70A, and a deformable member 84 which extends from the mount 38 to a terminal end 86. Here, the collar 82 of the second energy absorbing device 70B is fixed to the deformable member 84 adjacent to the terminal end 86. As best illustrated by comparing FIG. 11C to FIG. 11B, the deformable member 84 plastically deforms in response to the force acting on the vehicle 30 exceeding the second magnitude M2 such that the collar 82 is moved towards the mount 38 in response to the plastic deformation. Here, the deformable member 84 has a generally cylindrical shape and formed as a separate component from the mount 38 which, in turn, is adapted to attach to the vehicle 30, such as with fasteners 68. In the representative embodiment illustrated herein, the deformable member 84 is welded to the mount 38, and the collar 82 is welded to the housing 72 of the first energy absorbing device 70A. However, those having ordinary skill in the art will appreciate that the second energy absorbing device 70B could employ any suitable number of components, arranged or configured in any suitable way sufficient to support the first energy absorbing device 70A, attach to the vehicle 30, and plastically deform in response to the force acting on the vehicle 30 exceeding the second magnitude M2, without departing from the scope of the present invention. Moreover, while the deformable member 84 is illustrated in FIG. 11C as having been "crumpled" to absorb force exceeding the second magnitude M2, those having ordinary skill in the art will appreciate that the deformable member 84 could be configured to "slip" or "yield" to effect plastic deformation, such as to allow relative movement between portions of the second energy absorbing device 70B in response to the force exceeding the second magnitude M2.

In this embodiment, the first and second energy absorbing devices 70A, 70B are arranged to function in series. More specifically, the first and second energy absorbing devices 70A, 70B each respectively absorb progressively larger forces across ranges of force magnitudes which may at least partially overlap. As such, if the force exceeds the range of the first energy absorbing device 70A, then the first energy absorbing device 70A absorbs a portion of the force and also transfers a portion of the force to the second energy absorbing device 70B. However, if the force remains smaller than the second magnitude M2, then the second energy absorbing device 38 may remain deactivated and may not absorb any of the force and remains in the rest position RP. Conversely, the first energy absorbing device 70A can be moved to an attenuated position AP in which the first energy absorbing device 70A is in a completely loaded state where the first energy absorbing device 70A does not absorb additional force and transfers all subsequent force to the second energy absorbing device 70B Here, the first energy absorbing device 70A could be advantageously configured to reach such a completely loaded state at a force magnitude at least as high as the second magnitude M2. Meanwhile, the second energy absorbing device 70B is configured to absorb at least a portion of the force when the force exceeds the second magnitude M2. Here, if the force exceeds the second magnitude M2 and the first energy absorbing device 70A reaches the completely loaded state, the second energy absorbing device 70B plastically deforms and to absorb at least a portion of the force beyond the force absorbed by the movement of the first energy absorbing device 70A. However, if the force remains smaller than the second magnitude M2, the second energy absorbing device 70B remains deactivated and does not absorb any of the force. Thus, forces acting on the vehicle 30 which are less than the second magnitude M2 can be attenuated by the first energy absorbing device 70A without necessitating replacement of components of the seat assembly 32 or one or more of the EA kits 50.

As noted above, in one embodiment of the present invention, the seat assembly 32 is provided for supporting an occupant of the vehicle 30 and for translating forces occurring between the vehicle 30 and the occupant. To that end, as shown in FIGS. 4, 5, 14, and 15, the seat assembly 32 generally includes a seat bottom 88 and a seat back 90 supporting the seat bottom 88. In the representative embodiment illustrated in FIGS. 4-6 and 10-13, the couplers 42 are provided operatively attached to the seat back 90 such that the seat assembly 32 can be removably secured to the receivers 44 of either respective non-EA kits 48 or EA kits 50, as described above. However, in the representative embodiment illustrated in FIGS. 14-19, the seat assembly 32 is operatively attached to the first energy absorbing device 70A without the use of couplers 42 or receivers 44. As will be appreciated from the subsequent description below, this configuration is suitable for applications where the seat assembly 32 and the energy absorbing devices 70A, 70B are designed to be serviced or otherwise replaced together, such as where the modularity afforded by the securing system 34 described above is not required.

Figure 16:
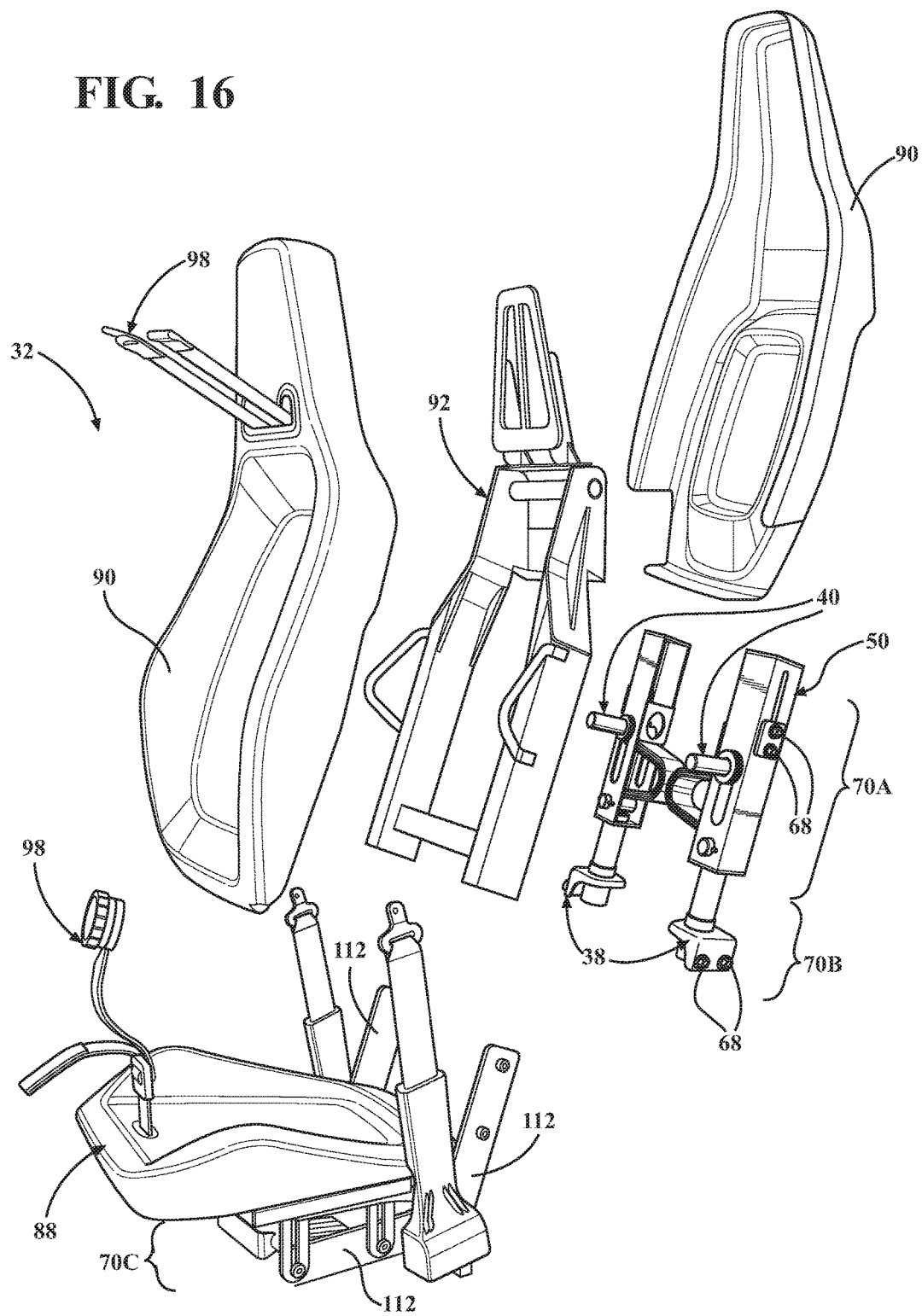
FIG. 16 is a partially exploded perspective view of the seat assembly of FIGS. 14-15, showing the initial energy absorbing device operatively attached to portions of the seat assembly, and showing a pair of EA kits each having staged first and second energy absorbing devices.
Figure 17:
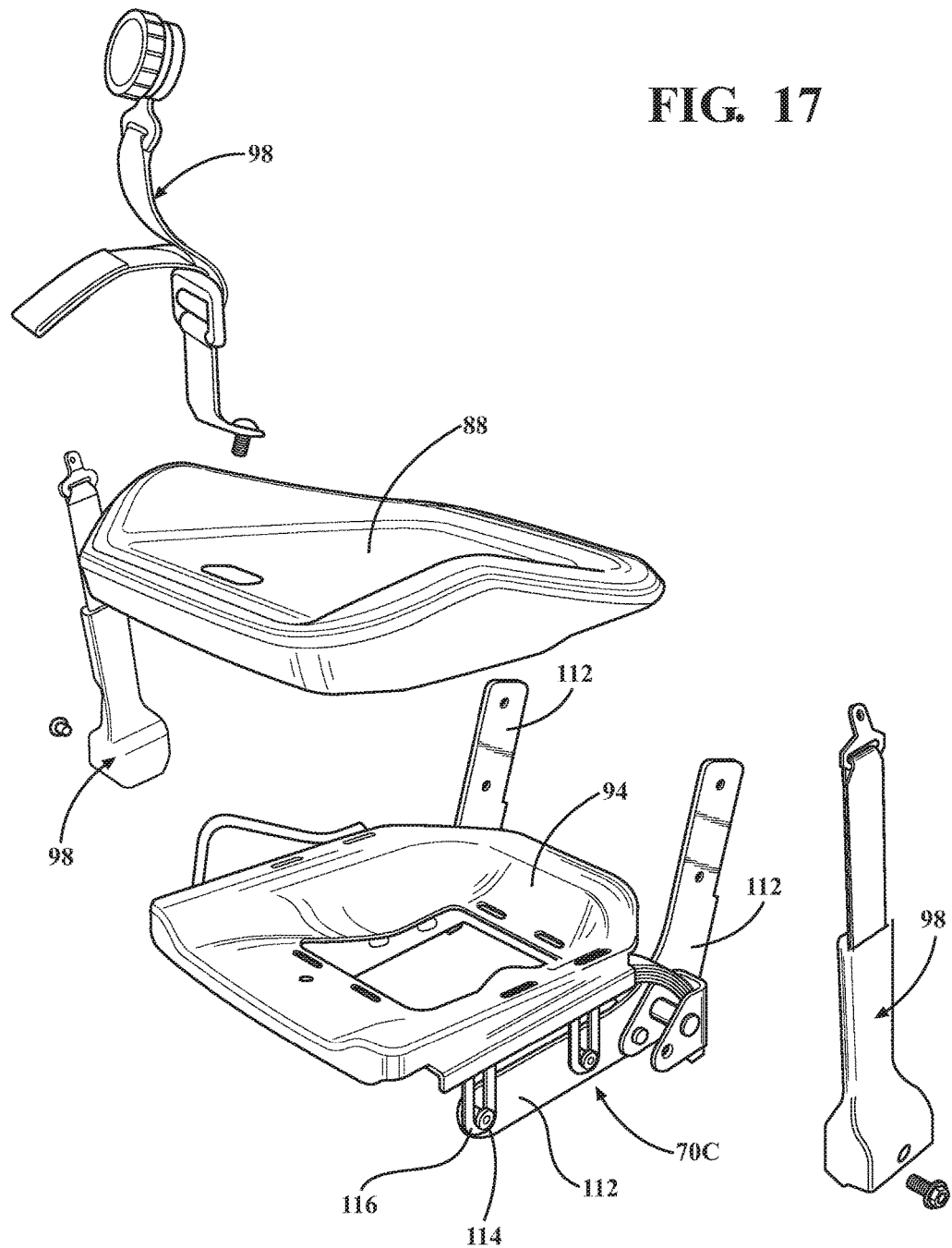
FIG. 17 is a partially exploded perspective view of the seat assembly of FIGS. 14-15 showing the initial energy absorbing device and portions of the seat assembly.

As shown best in FIGS. 16-18, the seat back 88 may have a "shell-like" configuration in which a seat back frame 92 is supported, and the seat bottom 88 may include a structural member 94 that provides structural rigidity and support to the seat assembly 32 and generally facilitate connection of and between the various components of the seat assembly 32, as described in greater detail below. Typically, the seat back frame 92 and the structural member 94 are formed of metal. However, those having ordinary skill in the art will appreciate that the seat back frame 92 and/or the structural member 94 could be formed or otherwise manufactured from any suitable material sufficient to provide proper support for the occupant.

As shown in FIGS. 4, 5, 14, and 19, the seat back 90 and/or seat bottom 88 may include one or more bolsters 96 formed such as using cushions or, commonly manufactured from foam (not shown in detail) covered by fabric (not shown in detail). The foam and fabric typically cover the seat back frame 92 and the structural member 94. Those having ordinary skill in the art will appreciate that the foam and/or the fabric of the seat back 90 can be the same type of material or a different type of material than the foam and the fabric of the seat bottom 88, or could be configured differently, or otherwise omitted entirely, without departing from the scope of the present invention. When force is exerted through the vehicle 30 to the seat assembly 32, as discussed above, the foam also compresses between the occupant and the structural member 94 and/or the seat back frame 92 to absorb at least a portion of the force to reduce or eliminate the magnitude of the force delivered to the occupant. The foam is typically resilient such that the foam returns to an original configuration after absorbing the force. Further, it is conceivable that the seat back 90 and/or the seat bottom 88 could include air bags (not shown) for inflation when the vehicle 30 is subjected to a force exceeding a predetermined magnitude. It is also conceivable that the seat back 90 and/or seat bottom 88 could include bladders (not shown) adapted to be inflated with gas and configured to rupture when subjected to a force exceeding a predetermined magnitude. By way of non-limiting example, the bladders could be formed or otherwise manufactured from a flexible polymeric material and may be configured so as to cushion the occupant upon "slam down," (i.e., when the vehicle 30 lands on the ground after being airborne). It is conceivable that the air bags and/or bladders could be disposed in the seat back 90 and/or the seat bottom 88 and/or in bolsters 96.

Figure 4:
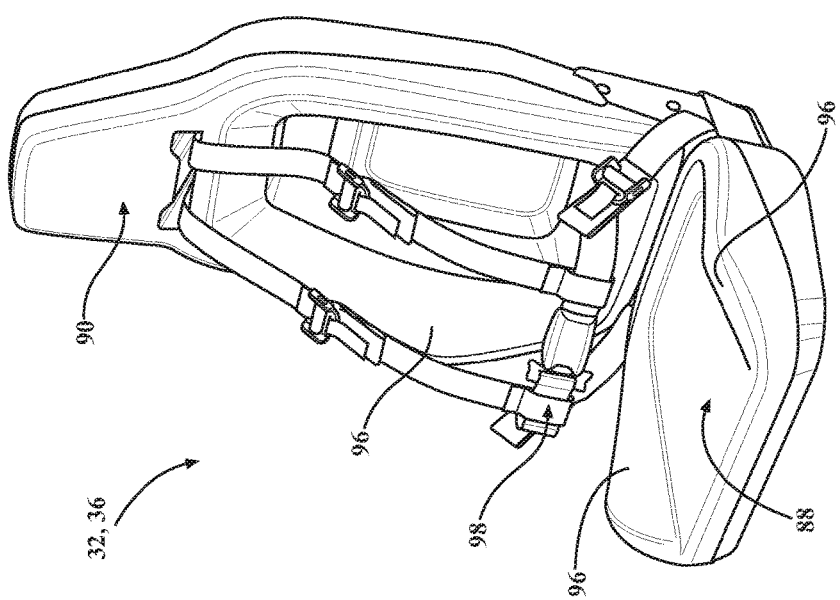
FIG. 4 is a perspective view of a component configured use with a securing system according to one embodiment of the present invention, with the component shown being realized as a suspended occupant seat assembly as depicted in FIGS. 1-3.

The seat assembly 32 may also include a seat belt, generally indicated at 98. In the representative embodiment illustrated in FIGS. 14-15, the seat belt 98 is of a "five-point harness" configuration. However, those having ordinary skill in the art will appreciate that the seat belt 98 could be of any type or configuration, such as, for example, a conventional "three-point" harness seat belt, or as a "four-point" harness as depicted in FIGS. 4 and 5, without departing from the scope of the present invention. The seat belt 98 may include a retractor (not described in detail, but commonly known in the art) and may be mounted, anchored, or otherwise attached to portions of the seat assembly 32 and/or the vehicle 30 in any suitable way. Moreover, the seat assembly 32 may further include various additional support and/or structural brackets, braces, plates, washers, bushings, bolts, etc. (not described in detail) to provide rigidity and support to the components of the seat assembly 32 and/or to facilitate mounting of the seat assembly 32, such as to the EA kits 50, as noted above.

As was described in connection with FIGS. 11A-11C above, the first energy absorbing device 70A depicted in the embodiment illustrated in FIGS. 14-19 is likewise supported by the second energy absorbing device 70B and is operatively attached to the seat back 90 to move concurrently with the seat back 90 between the rest position RP and the attenuated position AP in response to the force reaching the first magnitude M1. Here too, the first energy absorbing device 70A employs the interface member 40, the housing 72, the track 74, the pin 78, and the leaf spring assembly 76 to effect movement between the rest position RP and the attenuated position AP. While the interface member 40 is similarly realized with a plate-like configuration in this embodiment, as shown best in FIG. 19, a stroking rod 100 is provided operatively attached to and extending from the interface member 40.

Figure 19:
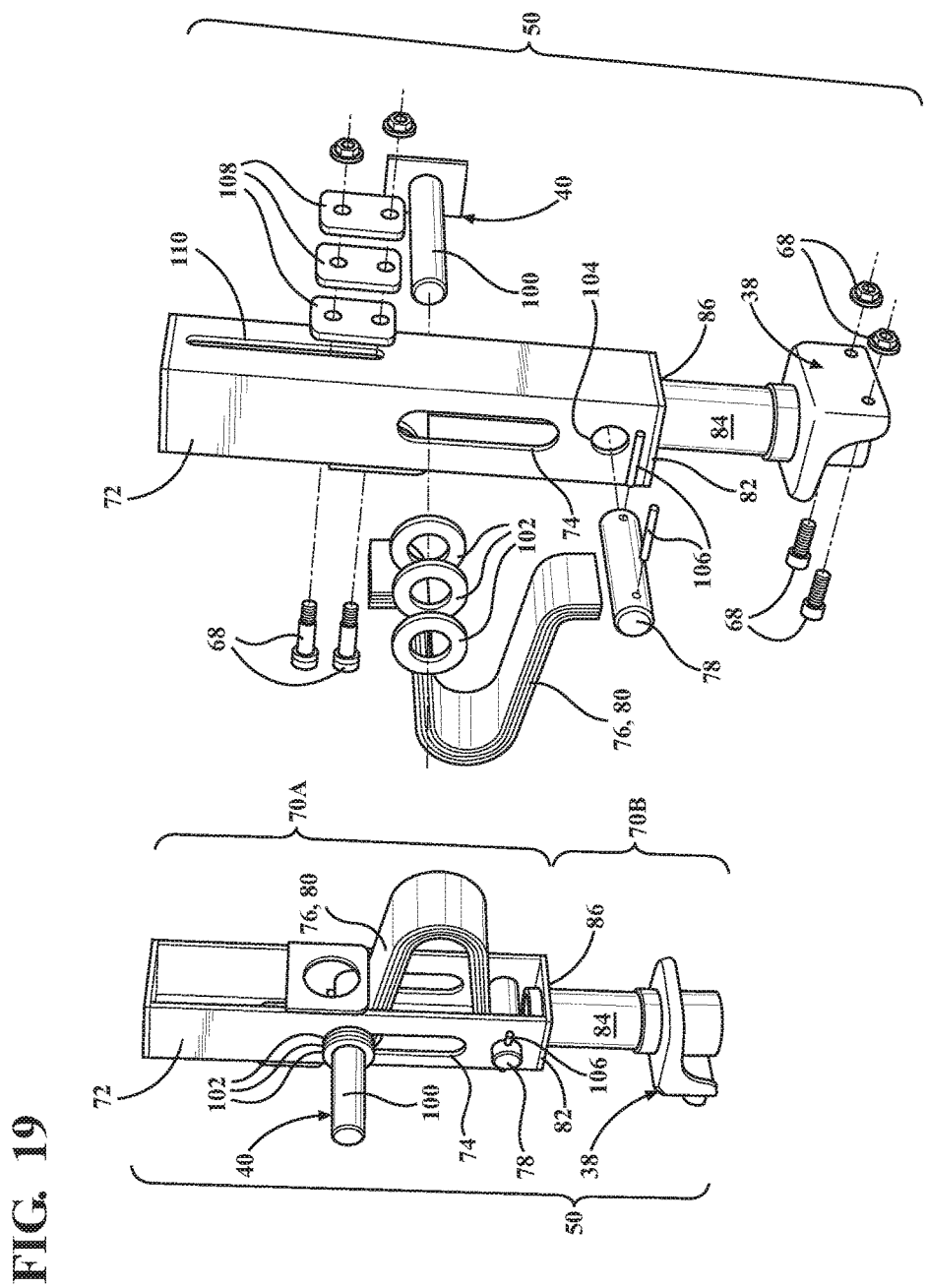
FIG. 19 is a perspective view of the EA kits depicted in FIG. 16 with one of the EA kits shown partially exploded showing portions of the first and second energy absorbing devices.
Figure 20:
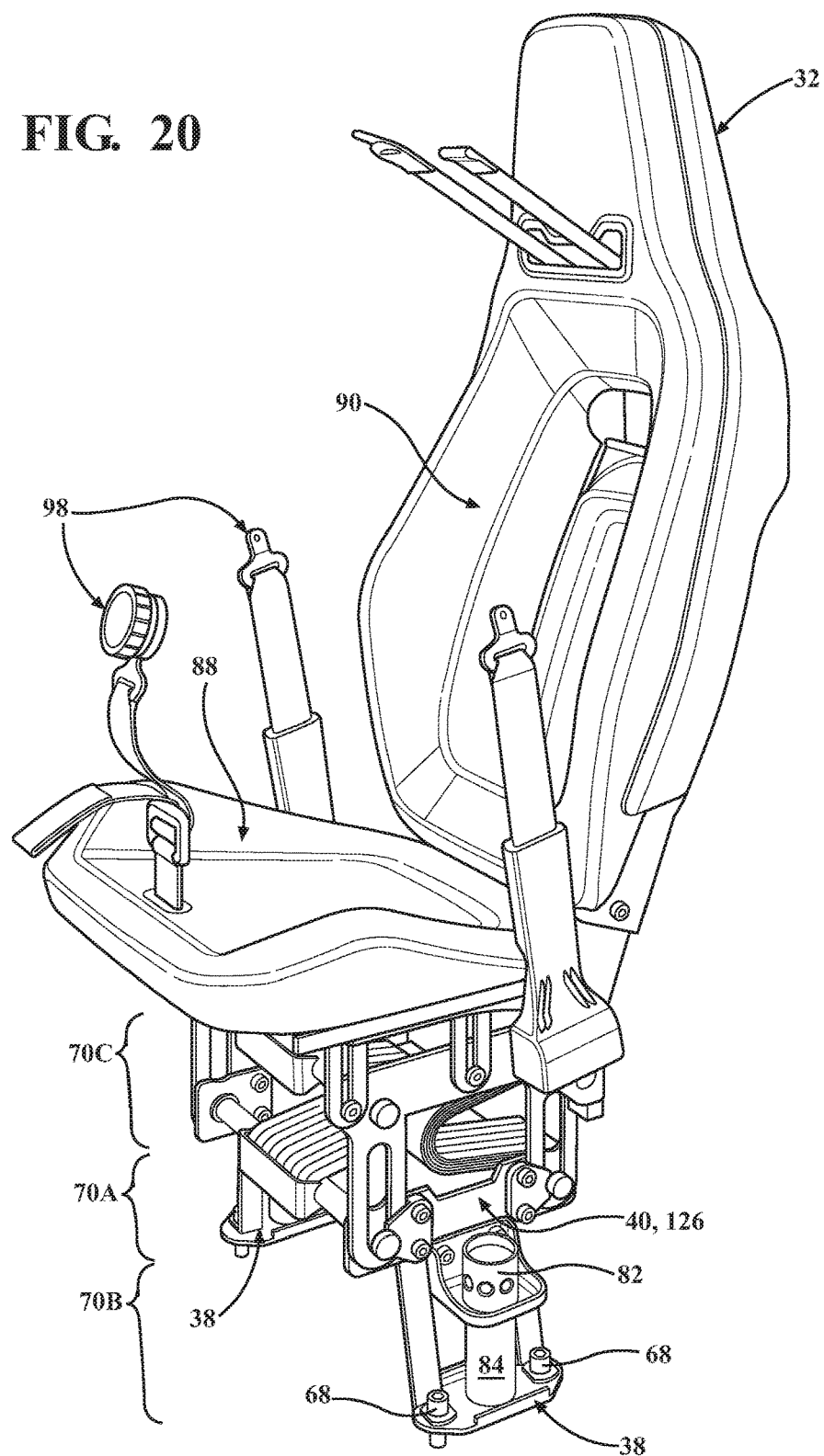
FIG. 20 is a perspective view of a floor-mounted occupant seat assembly as depicted in FIGS. 1-3 shown having initial, first, and second energy absorbing devices according to another embodiment of the present invention.
Figure 21:
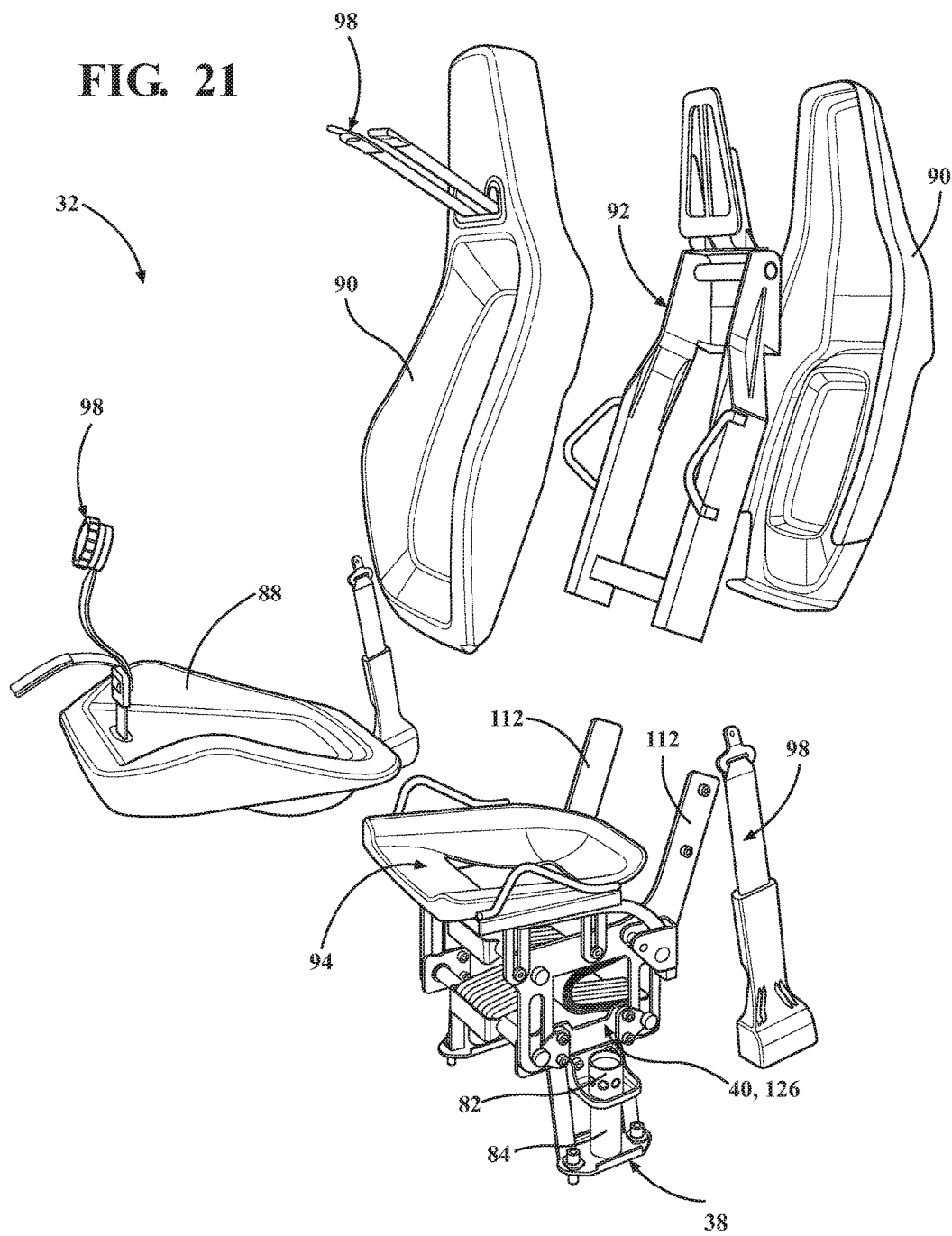
FIG. 21 is a partially exploded perspective view of the seat assembly of FIG. 20, showing the initial, first, and second energy absorbing device operatively attached to portions of the seat assembly.

The stroking rod 100 is slidably supported within the track 74 of the housing 72 and cooperates with the pin 78 to engage the leaf spring assembly 76 to urge the interface member 40 away from the second energy absorbing device 70B. It will be appreciated that the stroking rods 100 may be operatively attached to the seat back 90 in any suitable way in this embodiment, such as directly to the seat back frame 92. In addition, as shown in FIG. 19, one or more friction spacers 102 supported along the stroking rod 100 and interposed between the housing 72 and the seat back frame 92. As is also shown in FIG. 19, in this embodiment, the pin 78 is supported in apertures 104 formed in the housing 72, and is retained within the apertures 104 by a pair of retention pins 106. While fasteners 68 are similarly employed to secure the mount 38 to the vehicle, additional fasteners 68 and friction washers 108 may be provided to secure a portion of the housing 72 of the first energy absorbing device 70A to another portion of the vehicle 30 spaced from the mount 38, with the additional fasteners 68 supported in slots 110 formed in the housing 72 and arranged to allow relative movement of the first energy absorbing device 70A with respect to the vehicle 30 in response to plastic deformation of the second energy absorbing device 70B, as noted above (compare relative position of housing 72 in FIGS. 11B and 11C).

Here too, as was described in connection with FIGS. 11A-11C above, the second energy absorbing device 70B depicted in the embodiment illustrated in FIGS. 14-19 is likewise configured to plastically deform in response to the force reaching the second magnitude M2. Thus, the second energy absorbing device 70B similarly supports the first energy absorbing device 70A and is adapted for attachment to the vehicle 30 for concurrent movement with the vehicle 30 via the mount 38, from which the deformable member 84 extends to the terminal end 86 about which the collar 82 is supported and is operatively attached to the housing 72 of the first energy absorbing device 70A (see FIG. 19; compare to FIGS. 13 and 11A-11C). Furthermore, here too in this embodiment, the mount 38, the interface member 40, the first energy absorbing device 70A, and the second energy absorbing device 70B cooperate to define the EA kit 50 adapted for attachment to the vehicle 30, and a pair of EA kits 50 cooperate to support the seat assembly 32 in the vehicle 30.

Referring now to FIGS. 14-19, in this embodiment, the seat assembly 32 further includes a riser 112 supporting the seat back 90 with a plurality of guide members 114 extending from the riser 112. To that end, the riser 112 is configured to secure to the seat back frame 92 of the seat back 90. Here, the structural member 94 supporting the seat bottom 88 includes a plurality of channel members 116 depending from the structural member 94, and the guide members 114 of the riser 112 are slidably supported along the respective channel members 116 so as to allow relative movement between the seat back 90 and the seat bottom 88. In this embodiment, the seat assembly 32 also includes an initial energy absorbing device, generally indicated at 70C, interposed in force-translating relationship between the riser 112 and the structural member 94 to absorb at least a portion of the force exerted on the vehicle 30 when the force reaches an initial magnitude MI. In this embodiment, as shown best in FIGS. 17 and 18, the initial energy absorbing device 70C includes at least one cantilevered spring, generally indicated at 118, which is coupled to the riser 112 and which engages the structural member 94 so as to urge the structural member 94 away from the guide members 114 of the riser 112.

Figure 18:
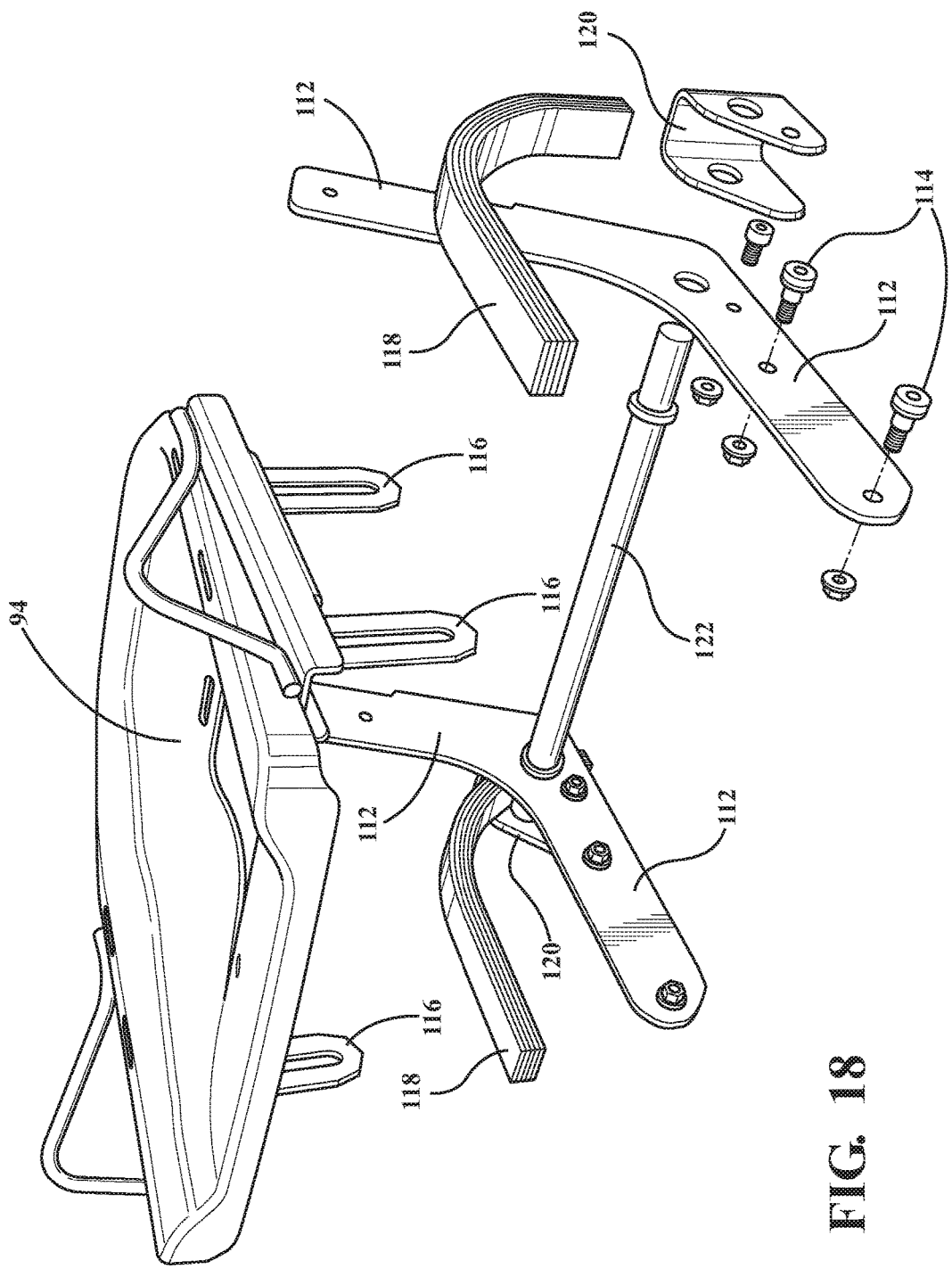
FIG. 18 is a partially exploded perspective view of the initial energy absorbing device of FIGS. 14-17 shown alongside portions of the seat assembly.

As best shown in FIG. 18, the seat assembly 32 depicted employs a pair of risers 112 each having a respective pair of guide members 114. Here, a bracket 120 is arranged to be secured to each riser 112, with each bracket 120 being configured to supporting a respective arrangement of cantilevered springs 118. In addition, a crosstube 122 extends between the risers 112 and the brackets 120 so as to provide rigidity between the risers 112 and help to support the arrangements of cantilevered springs 118.

Like the first energy absorbing device 70A and the second energy absorbing device 70B described above, the initial energy absorbing device 70C can likewise be designed such that the initial magnitude MI could have any suitable numerical measurement or range of numerical measurements. For example, the initial magnitude MI of the force (such as the magnitude that moves the seat bottom 88 with respect to the seat back 90) may be between 0 G and 100 G.

Those having ordinary skill in the art will appreciate that the initial energy absorbing device depicted in connection with the embodiment of the seat assembly 32 illustrated in FIGS. 14-19 could be implemented in connection with the component 36 of the securing system 34 described in greater detail above in connection with FIGS. 4-13.

As noted above, a "floor-mounted" embodiment of the seat assembly 32 is depicted in FIGS. 20-23. Here, like the "suspended" embodiment of the seat assembly 32 described in connection with FIGS. 14-19, the seat assembly 32 is configured to attach to the vehicle 30 without the use of couplers 42 or receivers 44. As will be appreciated from the subsequent description below, this configuration is suitable for applications where a "floor-mounted" seat assembly 32 is advantageous, and where the seat assembly 32 and the energy absorbing devices 70A, 70B, 70C are designed to be serviced or otherwise replaced together, such as where the modularity afforded by the securing system 34 described above is not required.

Referring now to FIGS. 20-23, as noted above, the "floor-mounted" seat assembly 32 depicted in this embodiment likewise includes the initial energy absorbing device 70C interposed in force-translating relationship between the riser 112 and the structural member 94 to absorb at least a portion of the force exerted on the vehicle 30 when the force reaches the initial magnitude MI. Here too, the riser 112 likewise supports the seat back 90 and employs guide members 114 which, in turn, are slidably supported in the channel members 116 of the structural member 94 so as to allow relative movement between the seat back 90 and the seat bottom 88, whereby the cantilevered spring 118 coupled to the riser 112 engages the structural member 94 so as to urge the structural member 94 away from the guide members 114 of the riser 112.

Figure 22:
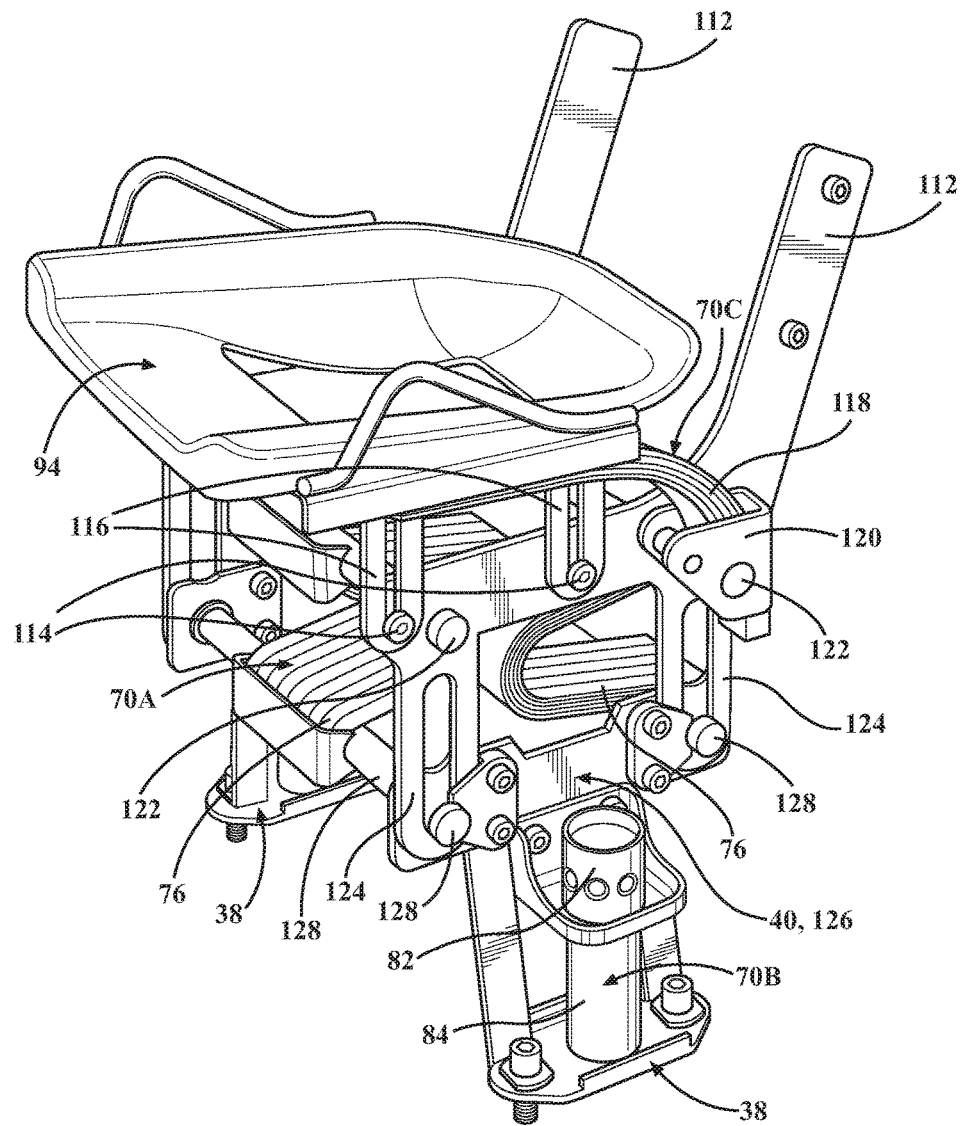
FIG. 22 is a perspective view of portions of the seat assembly of FIGS. 20-21 showing additional detail of the initial, first, and second energy absorbing devices.
Figure 23:
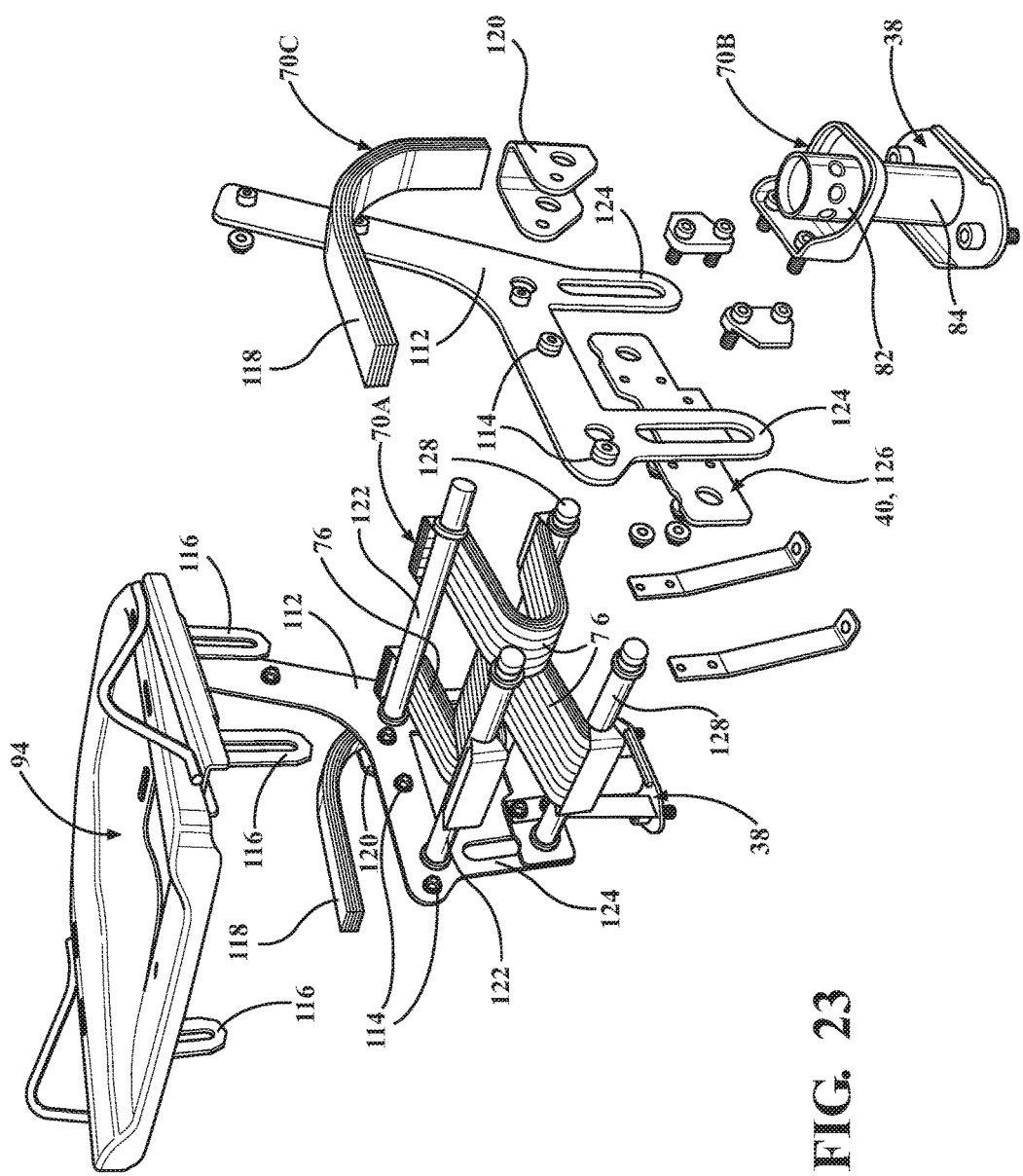
FIG. 23 is a partially exploded perspective view of the portions of the seat assembly and the energy absorbing devices shown in FIG. 22.

However, as is described in greater detail below, the first and second energy absorbing devices 70A, 70B are arranged differently in the embodiment of the "floor mounted" seat assembly 32 depicted in FIGS. 20-23. To that end, as best shown in FIGS. 22 and 23 the risers 112 each further include a pair of secondary channel members 124 depending therefrom, and a pair of crosstubes 122 extend between the risers 112 and are arranged adjacent to the secondary channel members 124. Here, the interface members 40 are realized as intermediate plates 126, which support a pair of secondary crosstubes 128 which, in turn, are slidably supported in the secondary channel members 124 of the risers 112. In this embodiment, a set of three leaf spring assemblies 76 are arranged so as to each engage one of the crosstubes 122 and one of the secondary crosstubes 128 and are arranged in force-translating relationship between the intermediate plates 126 and the risers 112 so as to urge the seat bottom 88 away from the intermediate plates 126. Thus, in this embodiment, intermediate plates 126 serve as the interface members 40 and cooperate with the secondary channel members 124 of the risers 112, the crosstubes 122, the secondary crosstubes 128, and the leaf spring assemblies 76 to define the first energy absorbing device 70A. In this embodiment, as shown best in FIG. 23, a pair of second energy absorbing device 70B are configured to secure to respective intermediate plates 126, such as with fasteners 68. As such, here too in this embodiment, the second energy absorbing device 70B similarly supports the first energy absorbing device 70A and is adapted for attachment to the vehicle 30 for concurrent movement with the vehicle 30 via the mount 38, from which the deformable member 84 extends to the terminal end 86 about which the collar 82 is supported and is operatively attached to the intermediate plate 126 of the first energy absorbing device 70A.

In this way, the securing system 34 and seat assemblies 32 of the present invention provide significant opportunities for improved occupant safety in connection with vehicles 30 while, at the same time, reducing the cost and complexity of manufacturing, assembling, using, and servicing occupant seat assemblies 32. Specifically, it will be appreciated that the energy absorbing devices 70A, 70B, 70C described herein can be arranged in a number of different ways so as to accommodate various vehicle 30 applications and, at the same time, can be easily adjusted, tuned, or oriented so as to significantly enhance occupant safety without necessitating complete replacement of the seat assembly 32 when the vehicle 30 is exposed to explosions below the second magnitude M2. Moreover, it will be appreciated that the modularity afforded by the securing system 34 allows components 36 such as "suspended" seat assemblies 32 to be easily moved between vehicles 30 of different types of configurations as needed in use. Similarly, it will be appreciated that the securing system 34 allows vehicles 30 do be "upgraded" from non-EA kits 48 to EA kits 50, or "downgraded" from EA kits 50 to non-EA kits 48 to accommodate changes in the intended use of particular vehicles 30 as required.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A seat assembly for supporting an occupant of a vehicle and for translating forces occurring between the vehicle and the occupant, said seat assembly comprising:
    a seat bottom;
    a seat back supporting said seat bottom;
    a first energy absorbing device operatively attached to said seat back with said first energy absorbing device and said seat back moving concurrently between a rest position and an attenuated position, and said first energy absorbing device absorbing at least a portion of a force exerted on the vehicle with said first energy absorbing device moving from said rest position to said attenuated position in response to the force reaching a first magnitude and returning to said rest position in response to the force being below the first magnitude; and
    a second energy absorbing device supporting said first energy absorbing device and adapted for attachment to the vehicle with said second energy absorbing device plastically deforming to absorb at least a portion of the force when the force exceeds a second magnitude greater than the first magnitude;
    wherein said first energy absorbing device includes an interface member operatively attached to said seat back and a housing operatively attached to and extending between said interface member and said second energy absorbing device with a track defined in said housing and with said interface member slidably supported along said track for movement between said rest position and said attenuated position.

2. The seat assembly as set forth in claim 1, further including a mount coupled to said second energy absorbing device and adapted for attachment to the vehicle for concurrent movement with the vehicle, and said interface member spaced from said mount and operatively attached to said seat back and to said first energy absorbing device.

3. The seat assembly as set forth in claim 2, wherein said mount, said interface member, said first energy absorbing device, and said second energy absorbing device cooperate to define an EA kit adapted for attachment to the vehicle, and wherein a pair of EA kits cooperate to support said seat assembly in the vehicle.

4. The seat assembly as set forth in claim 1, further including:
    a riser supporting said seat back with a plurality of guide members extending from said riser;
    a structural member supporting said seat bottom with a plurality of channel members depending from said structural member and with said guide members of said riser slidably supported along said channel members so as to allow relative movement between said seat back and said seat bottom; and
    an initial energy absorbing device interposed in force-translating relationship between said riser and said structural member to absorb at least a portion of the force exerted on the vehicle when the force reaches an initial magnitude with said initial energy absorbing device having a cantilevered spring coupled to said riser and engaging said structural member so as to urge said structural member away from said guide members of said riser.

5. The seat assembly as set forth in claim 1, wherein said first energy absorbing device includes a leaf spring assembly disposed in force-translating relationship between said housing and said interface member and arranged so as to urge said interface member away from said second energy absorbing device.

6. The seat assembly as set forth in claim 5, wherein said leaf spring assembly includes a plurality of leaf spring elements each having a generally U-shaped profile.

7. The seat assembly as set forth in claim 1, including a m mount adapted for attachment to the vehicle, and a receiver operatively attached to said interface member, and with a coupler attached to said seat back to be secured to said receiver.

8. The seat assembly as set forth in claim 7, wherein said coupler has a cylindrical body extending from said seat back, and wherein said receiver has a sleeve attached to said interface member arranged to receive at least a portion of said cylindrical body when said receiver is in a first position.

9. The seat assembly as set forth in claim 8, wherein said coupler has a notch defined in said cylindrical body adjacent a tapered end, and wherein said receiver includes a latch arranged to engage said notch when said receiver is in said first position to restrict axial movement of said cylindrical body of said coupler along said sleeve of said receiver and to disengage said notch when said receiver is in a second position to allow axial movement of said cylindrical body of said coupler along said sleeve of said receiver.

10. The seat system as set forth in claim 9, wherein said receiver includes a biasing device disposed in force-translating engagement with said latch and arranged so as to urge said latch into engagement with said notch of said coupler.

11. A seat assembly for supporting an occupant of a vehicle and for translating forces occurring between the vehicle and the occupant, said seat assembly comprising:
    a seat back supported by a riser having a plurality of guide members extending therefrom;
    a seat bottom supported by a structural member having a plurality of channel members depending therefrom with said guide members of said riser slidably supported along said channel members so as to allow relative movement between said seat back and said seat bottom;

an initial energy absorbing device interposed in force-translating relationship between said riser and said structural member to absorb at least a portion of a force exerted on the vehicle when the force reaches an initial magnitude with said initial energy absorbing device having a cantilevered spring coupled to said riser and engaging said structural member so as to urge said structural member away from said guide members of said riser;

a first energy absorbing device operatively attached to said seat back to absorb at least a portion of the force exerted on the vehicle when the force reaches a first magnitude greater than the initial magnitude; and a second energy absorbing device supporting said first energy absorbing device and adapted for attachment to the vehicle with said second energy absorbing device plastically deforming to absorb at least a portion of the force when the force exceeds a second magnitude greater than the first magnitude.

12. A seat assembly for supporting an occupant of a vehicle and for translating forces occurring between the vehicle and the occupant, said seat assembly comprising:
   a seat bottom;
   a seat back supporting said seat bottom;
   a first energy absorbing device operatively attached to said seat back with said first energy absorbing device and said seat back moving concurrently between a rest position and an attenuated position, and said first energy absorbing device absorbing at least a portion of a force exerted on the vehicle with said first energy absorbing device moving from said rest position to said attenuated position in response to the force reaching a first magnitude and returning to said rest position in response to the force being below the first magnitude; and a second energy absorbing device supporting said first energy absorbing device and adapted for attachment to the vehicle with said second energy absorbing device plastically deforming to absorb at least a portion of the force when the force exceeds a second magnitude greater than the first magnitude;

wherein said second energy absorbing device includes a collar operatively attached to said first energy absorbing device, a mount adapted for attachment to the vehicle for concurrent movement with the vehicle, and a deformable member extending from said mount to a terminal end with said collar fixed to said deformable member adjacent to said terminal end.

13. The seat assembly as set forth in claim 12, wherein said deformable member plastically deforms in response to the force acting on the vehicle exceeding the second magnitude such that said collar is moved toward said mount in response to the plastic deformation.

* * * * *

UNITED STATES PATENT AND TRADEMARK OFFICE
CERTIFICATE OF CORRECTION

PATENT NO. : 10,272,805 B2
APPLICATION NO. : 15/097940
DATED : April 30, 2019
INVENTOR(S) : Sorin Coman Page 1 of 1

It is certified that error appears in the above-identified patent and that said Letters Patent is hereby corrected as shown below:

In the Claims

Column 16, Line 39 (Claim 7): Please delete "m mount" and replace with --mount--.

Signed and Sealed this
Tenth Day of September, 2019

Andrei Iancu
*Director of the United States Patent and Trademark Office*